US007623680B2

United States Patent
Takahama et al.

(10) Patent No.: US 7,623,680 B2
(45) Date of Patent: Nov. 24, 2009

(54) IMAGE PROCESSING SYSTEM AND METHOD FOR FRONT-VIEW IMAGE SENSOR

(75) Inventors: Taku Takahama, Yokohama (JP);
Takeshi Kimura, Yokohama (JP);
Naotaka Usui, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 859 days.

(21) Appl. No.: 11/171,396

(22) Filed: Jul. 1, 2005

(65) Prior Publication Data

US 2006/0002587 A1      Jan. 5, 2006

(30) Foreign Application Priority Data

Jul. 5, 2004    (JP)    ............... 2004-198178

(51) Int. Cl.
*G06K 9/00* (2006.01)
(52) U.S. Cl. ............ 382/104; 382/106
(58) Field of Classification Search ........... 382/103, 382/104, 181, 106; 348/116, 118, 148
See application file for complete search history.

(56) References Cited

U.S. PATENT DOCUMENTS

| 5,410,346 | A | * | 4/1995 | Saneyoshi et al. | ........... 348/116 |
| 6,025,797 | A | | 2/2000 | Kawai et al. | |
| 6,452,535 | B1 | | 9/2002 | Rao et al. | |
| 6,990,253 | B2 | * | 1/2006 | Takeda et al. | ............ 382/276 |
| 2003/0142007 | A1 | | 7/2003 | Ono et al. | |

FOREIGN PATENT DOCUMENTS

JP    10-097699 A    4/1998

\* cited by examiner

*Primary Examiner*—Brian P Werner
*Assistant Examiner*—Claire Wang
(74) *Attorney, Agent, or Firm*—Foley & Lardner LLP

(57) ABSTRACT

An image processing system includes an image sensor that picks up a front-view image in front of an own vehicle. Image processing regions are set to cover on the front-view image, picked up by the image sensor, various portions one after another, which narrow, in area, with different positions in a direction remote from the own vehicle. A feature is extracted out of image processing a portion of the front-view image covered by the image processing regions. The extracted feature is used for vehicle detection.

23 Claims, 14 Drawing Sheets

OWN VEHICLE

TIME t [s]

OWN VEHICLE

TIME t+0.05 [s]

OWN VEHICLE

TIME t+0.10 [s]

OWN VEHICLE

TIME t+0.15 [s]

OWN VEHICLE

TIME t+0.2 [s]

OWN VEHICLE

TIME t+0.25 [s]

IMAGE PROCESSING SYSTEM AND METHOD FOR FRONT-VIEW IMAGE SENSOR

RELATED APPLICATION

The present application claims the benefit of priority from Japanese Patent Application No. 2004-198178, filed Jul. 5, 2004, which application is hereby incorporated by reference in its entirety.

BACKGROUND OF THE INVENTION

The present invention relates to an image processing system and method for a front-view image sensor.

JP-A10-097699 discloses an obstacle detecting device for a vehicle. According to the obstacle detecting device, the presence of a vehicle is judged after image processing a front-view image picked up by an image sensor in the form of a camera.

Under bad weather conditions, such as, rain or snow falling, the known device may not exhibit high performance in detecting the preceding vehicle in front.

An object of the present invention is to provide an image processing system with an enhanced obstacle detection performance.

SUMMARY OF THE INVENTION

According to one aspect of the present invention, there is provided an image processing system for a front-view image sensor, comprising: an image sensor so configured and arranged on an own vehicle as to pick up a front-view image in front of the own vehicle; a region setting block so constructed and arranged as to set an image processing region to cover on the front-view image various portions, one after another, which narrow, in area, with different positions in a direction remote from the own vehicle; a feature extracting block so constructed and arranged as to extract a feature out of image processing of the portion of the front-view image covered by the image processing region set by the region setting block; and a vehicle's presence judging block so constructed and arranged as to judge the presence of a vehicle based on the feature extracted by the feature extracting block.

DETAILED DESCRIPTION OF THE INVENTION

Figure 1:
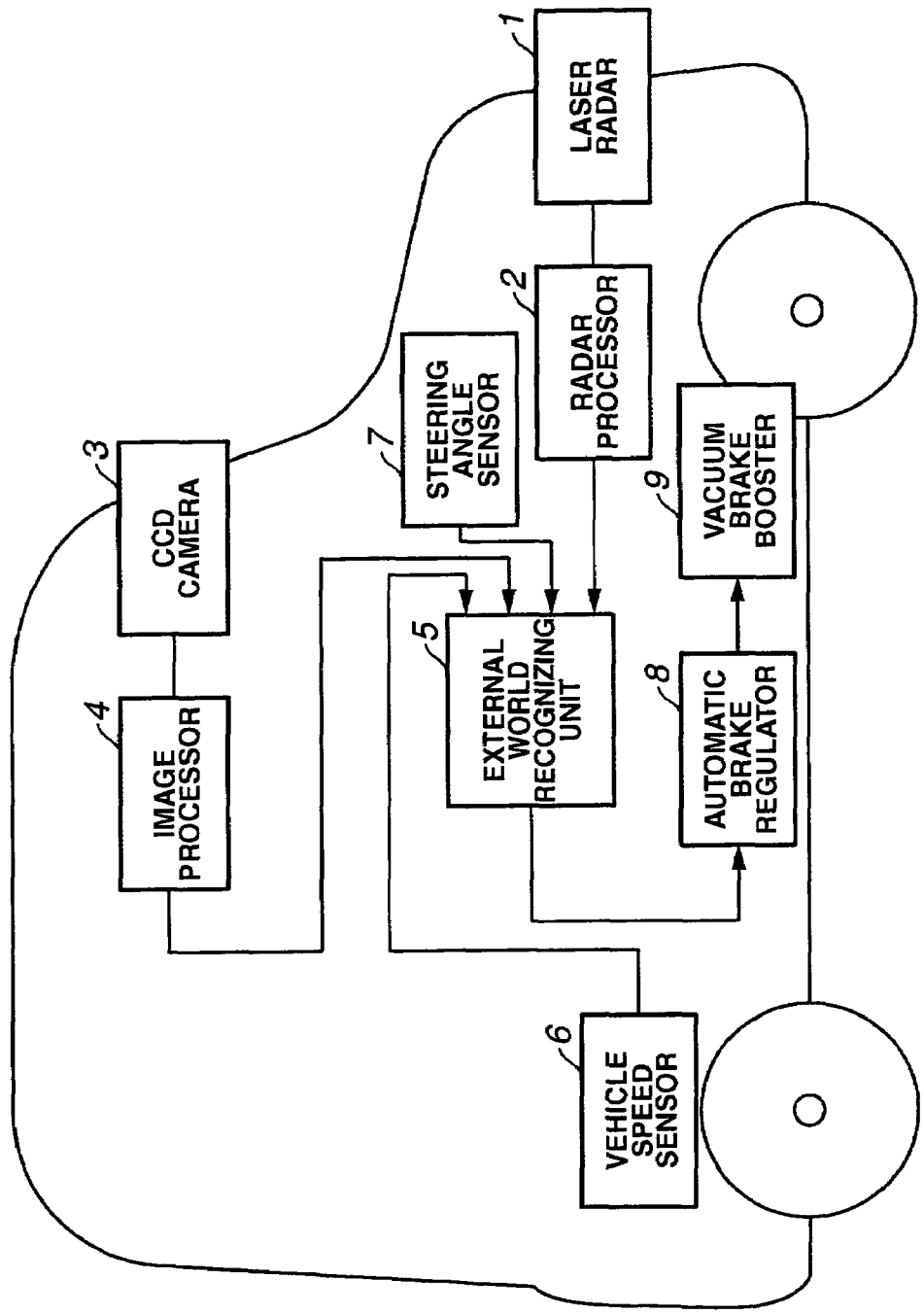
FIG. 1 is a diagram of a vehicle installed with hardware implementing the present invention.

The accompanying drawings illustrate various exemplary embodiments of a method and system according to the present invention. Like reference numerals are used throughout each Figure to designate like parts or portions.

Referring to FIG. 1, a motor vehicle is equipped with a method and system according to the present invention. This vehicle is hereinafter referred to as an own vehicle with respect to the preceding obstacle, such as a vehicle in the path of the own vehicle.

FIRST EXEMPLARY EMBODIMENT

With continuing reference to FIG. 1, a front-view image sensor, in the form of a laser-radar 1 of the scanning type, is positioned at a center of a front grill or a front bumper for transmitting an infrared pulsed beam ahead of the own vehicle in order to detect obstacles within the field of view of the radar. The infrared pulsed beam travels toward a measurement zone. A light receiving device receives the transmitted beam returning from an obstacle inside the measurement zone. Due to the use of a rotating polygonal mirror, two-dimensional scanning in the forward direction is possible, so that the pulsed beam can be swiveled horizontally due to the rotation of the polygonal mirror, and the pulsed beam can be swiveled vertically due to a plurality of mirror surfaces of the polygonal mirror inclined at different angles. In the embodiment, a beam of pulses can be swiveled horizontally and laterally about 6 degrees to each side of a longitudinal line passing through the center of the own vehicle. Based on the time delay and phase difference between the transmitted beam and the received reflected beam, a radar processor 2 can determine a distance and an azimuth angle between the own vehicle and each of the preceding vehicles in front.

Based on the measurement result from the laser radar 1, the radar processor 2 extracts at least one of the preceding vehicles in front of the own vehicle and calculates a position of the preceding vehicle and a magnitude, i.e., a width, thereof within a two-dimensional coordinates system having an origin at an appropriate point of the own vehicle. The two-dimensional coordinates system has a Y axis passing through the origin and lying in a longitudinal direction of the own vehicle and an X axis passing through the origin and lying in a lateral direction of the own vehicle. The radar processor 2 provides the calculated result to an external world recognizing unit 5.

A three-dimensional CCD camera of the progressive scanning type 3 is mounted to the own vehicle in the vicinity of an internal rear view mirror to pick up an image of a road ahead at high speed. The image picked up by the CCD camera 10 is received by an image processor 4. The image processor 4 selects and processes the picked up image locally at a portion corresponding to an area around the own vehicle in which the radar processor 2 has calculated the distance and the width of the preceding vehicle(s) to keep on detecting the preceding vehicle(s) even if the preceding vehicle is lost due to pitching variations of the own vehicle. The image processor 4 provides the processed result to the external world recognizing unit 5.

A vehicle speed sensor 6 detects a vehicle speed of the own vehicle by measuring a revolution speed of a road wheel or an output element of a transmission, and provides the detected vehicle speed to the external world recognizing unit 5.

A steering angle sensor 7 detects an angle or an angular position of a steering wheel of a steering system mounted to the own vehicle and provides the detected steering angle to the external world recognizing unit 5.

Based on the inputs from the radar processor 2, image processor 4, vehicle speed sensor 6 and steering angle sensor 7, the external world recognizing unit 5 detects the preceding vehicle, determines whether or not the detected preceding vehicle is a target obstacle, controls an automatic brake regulator 8 if need arises due to the target obstacle to activate a vacuum brake booster 9 to apply braking force to the own vehicle.

In some embodiments, the CCD camera 3 and radar 1 may be used in conjunction to serve as an image sensor. In another embodiment of the present invention, the CCD camera 3 may serve as an image sensor. In another embodiment of the present invention, the radar 1 may serve as an image sensor. In the latter case, analysis may be performed upon information obtained by the radar 1 to identify objects in front of the own vehicle and/or the distance from the own vehicle to the object.

In the exemplary embodiments to be described below, the system detects the preceding vehicle(s) in front of the own vehicle by image processing a front-view image picked up by the CCD camera 3. The image processing takes over detection of the preceding vehicle(s) under driving conditions when the laser radar 1 cannot detect the preceding vehicle(s).

Figure 2:
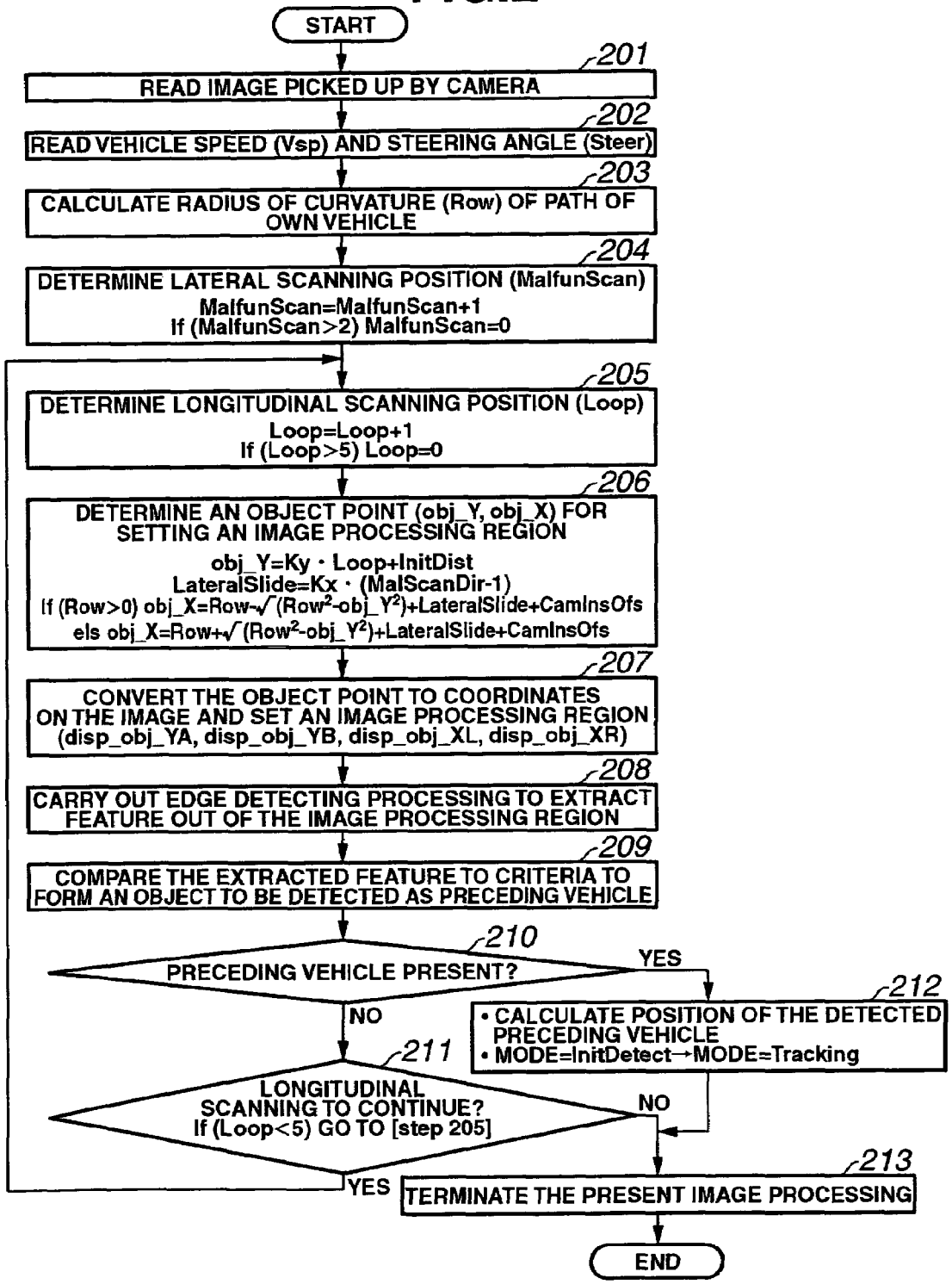
FIG. 2 is a flow chart illustrating operation of a first exemplary embodiment of an image processing system and method according to the present invention.

The flow chart in FIG. 2 illustrates operation of the first exemplary embodiment. The external world recognizing unit 5 repeats execution of processes for detection of the preceding vehicle(s) at regular intervals, for example, 50 milliseconds.

In FIG. 2, at step 201, the recognizing unit 5 performs reading operation of a front-view image picked up by the CCD camera 3 for present sampling. At the next step 202, it performs reading operation of a vehicle speed from the vehicle speed sensor 6 and a steering angle from the steering angle sensor 7. At step 203, it estimates a radius of curvature Row [m] of a future path of the own vehicle by calculating the following equation:

$$\text{Row} = (1 + A \cdot Vsp^2 \cdot LWB)/\text{Steer} \tag{1}$$

In the equation (1), the denotation A represents a stability factor that is a value peculiar to the own vehicle. The stability factor is a value regarded as a constant that is determined by a vehicle weight, a length of a wheelbase, a position of a center of weight and a lateral force of tire. The denotation Vsp [m/s] represents a vehicle speed of the own vehicle. The denotation LWB [m] represents a length of a wheelbase of the own vehicle. The denotation Steer [rad] represents a steering angle. The steering angle is positive when the steering wheel is turned to the right, and it is negative when the steering wheel is turned to the left.

At step 204, the recognizing unit 5 determines one lateral scanning position MalfunScan out of three lateral positions, namely, a central position in front of the own vehicle, a position on the right of the central position and a position on the left of the central position.

The term "scanning" is hereinafter used to mean a stream of image processing of a plurality of image processing regions set around object points, which are set corresponding to each of the lateral scanning positions and a plurality of longitudinal positions lying ahead in a longitudinal line passing through the lateral scanning position. In the first exemplary embodiment, upon elapse of an interval of 50 milliseconds, the recognizing unit 5 conducts a lateral scanning by selecting one of the lateral scanning positions after another in a predetermined order of the central position, the position on the right, the position on the left, the central position, the position on the right . . . , and conducts a longitudinal scanning ahead for detection of the preceding vehicle(s). Image processing regions, which are set within an own lane on a front-view image, may be set within an area protruded from the own lane to the adjacent lane.

Figure 3:
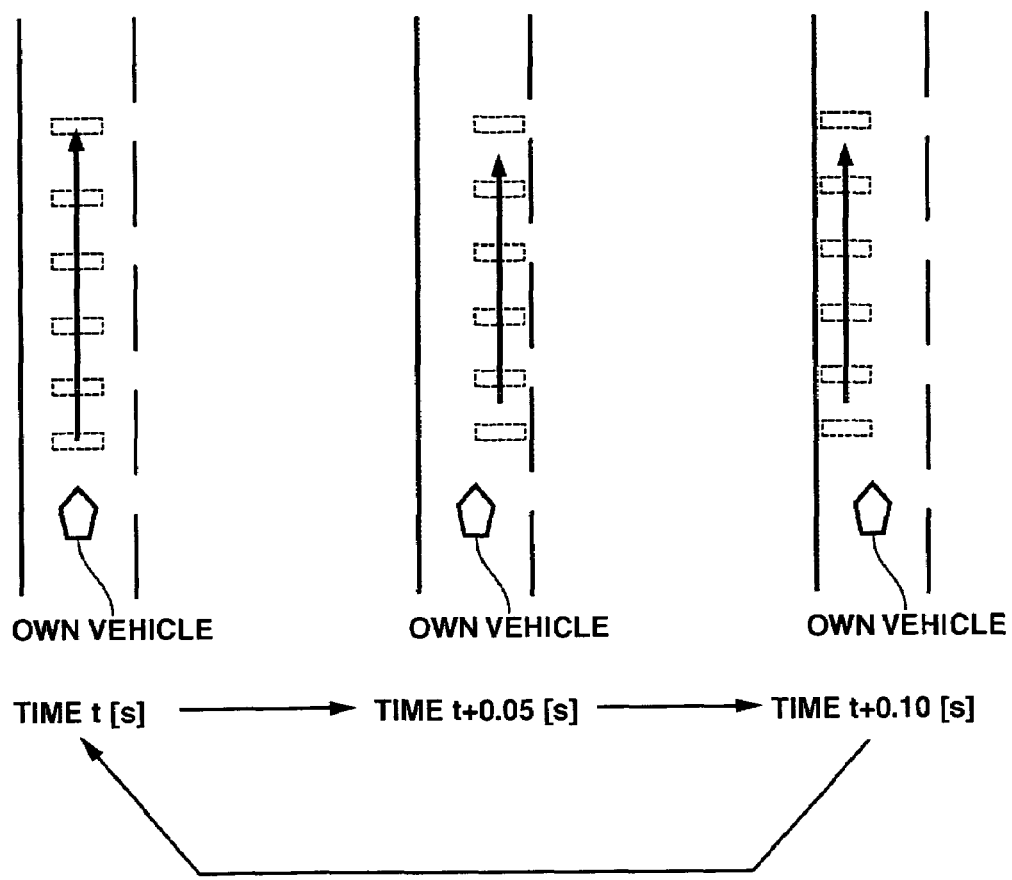
FIGS. 3(a) to 3(c) are views illustrating how to arrange object points for setting image processing regions according to the first exemplary embodiment.

Referring also to FIGS. 3(*a*) to 3(*c*), this section provides further description on scanning conducted according to the first exemplary embodiment. In each of FIGS. 3(*a*) to 3(*c*), broken line drawn slots illustrate object points. Each of the object points is determined corresponding to the selected lateral scanning position MalfunScan and a longitudinal scanning position Loop. The object points are determined for setting image processing regions, respectively. In each of FIGS. 3(*a*) to 3(*c*), an arrow indicates a direction of a longitudinal scanning of the imaginary processing regions that are set around the object points one after another in a longitudinal forward direction ahead the own vehicle. FIG. 3(*a*) illustrates a scanning conducted by execution of the routine illustrated by the flow chart in FIG. 2 at moment t [s] when the lateral scanning position MalfunScan indicates the central position in front of the own vehicle. FIG. 3(*b*) illustrates a scanning conducted at moment t+0.05 [s] when the lateral scanning position MalfunScan indicates the position on the right of the central position. FIG. 3(*c*) illustrates a scanning conducted at moment t+0.10 [t] when the lateral scanning position MalfunScan indicates the position on the left of the central position.

Turning back to the flow chart in FIG. 2, the lateral scanning position MalfunScan determined at step 204 may be expressed as:

$$\text{MalfunScan} = \text{MalfunScan} + 1 \tag{2}$$

$$\text{If (MalfunScan>2) MalfunScan}=0 \tag{3}$$

In the equations (2) and (3), the denotation MalfunScan represents a counter that takes an initial value of 0 indicative of the central scanning position, and a value of 1 indicative of the scanning position on the right, and then a value of 2 indicative of the scanning position on the left. In general, an If (expression) statement means that the statement is carried out only if the expression is satisfied. In the equation (3), if MalfunScan exceeds 2, MalfunScan is set at the initial value of 0. From the equations (2) and (3), it will now be understood that the MalfunScan shifts to a new lateral scanning position upon execution of the control routine illustrated by the flow chart in FIG. 2. The lateral scanning position as indicated by MalfunScan shifts upon elapse of the interval of 50 milliseconds from the central position to the position on the right, and then to the position on the left, and then back to the central position.

At step 205, the recognizing unit 5 determines one longitudinal scanning position Loop out of six longitudinal scanning positions comprising the nearest position to the own vehicle (Loop=0), the remotest position from the own vehicle (Loop=5) and four intermediate positions (Loop=1, Loop=2, Loop=3, Loop=4).

The longitudinal scanning position Loop determined at step 205 may be expressed as:

$$\text{Loop}=\text{Loop}+1 \tag{4}$$

$$\text{If (Loop>5) Loop=0} \tag{5}$$

In each of the equations (4) and (5), the denotation Loop represents a counter that takes one of six values 0, 1, 2, 3, 4 and 5 in this order during each execution of the routine illustrated in FIG. 2. The value 0 is indicative of the nearest longitudinal scanning position to the own vehicle. The value 5 is indicative of the remotest longitudinal scanning position. The values 1, 2, 3 and 4 are indicative of intermediate longitudinal scanning positions becoming remoter in a direction from the nearest longitudinal scanning position toward the remotest longitudinal scanning position. In each of FIGS. 3(a) to 3(c), the broken line drawn slots illustrate longitudinal scanning positions indicated by the values 0, 1, 2, 3, 4, 5 taken by the counter Loop at step 205.

At step 206, the recognizing unit 5 determines an object point (obj_Y, obj_X) for setting an image processing region. The object point may be expressed as:

$$obj\_Y = Ky \cdot \text{Loop} + \text{InitDist} \tag{6}$$

$$\text{LateralSlide} = Ky \cdot (\text{MalScanDir}-1) \tag{7}$$

$$\text{If (Row>0), then: } obj\_X = \text{Row} - \sqrt{(\text{Row}^2 - obj\_Y^2)} + \text{LateralSlide} + \text{CamIns0}fs \tag{8}$$

$$\text{Else: } obj\_X = \text{Row} + \sqrt{(\text{Row}^2 - obj\_Y^2)} + \text{LateralSlide} + \text{CamIns0}fs \tag{9}$$

In each of the equations (6), (7), (8) and (9), the denotation obj_Y represents a distance [m] ahead from the own vehicle in a longitudinal direction, and the denotation obj_X represents a distance [m] from the longitudinal centerline of the own vehicle in a lateral direction. The denotation InitDist represents the nearest position to the own vehicle for longitudinal scanning and the detonation LateralSlide represents a slide [m] from the estimated track in front of the own vehicle for lateral scanning. As an ordinary value of InitDist, a distance per second [m/s] calculated from the vehicle speed Vsp is used. For example, if the vehicle speed Vsp is 100 km/h, the value of InitDist is about 28 m (InitDist=about 28 m). This is nothing but placing the nearest object point at least as far as the own vehicle can reach upon elapse of 1 second, that is, the time headway THW=1 second. InitDist may take a value longer than the ordinary value upon determination that the own vehicle is traveling on a highway based on information provided by an electronic map. InitDist may take a value smaller than the ordinary value upon determination that the own vehicle is traveling on a congested road based on traffic information provided by, for example, Vehicle Information and Communication System (VICS) in Japan. The denotation Ky represents an interval [m], at which execution of one step is repeated during a longitudinal scanning. The denotation Kx represents an interval [m], at which execution of one step is repeated during a lateral scanning. The denotation CamIns0fs represents an offset amount [m] from the longitudinal line passing through the center of the own vehicle to a position at which the camera 3 is mounted to the own vehicle. If (expression) statement 1 else statement 2 means that the statement 1 is carried out only if the expression is satisfied, and the statement 2 is carried out if the expression is not satisfied.

At step 207, the recognizing unit 5 converts the object point (obj_Y, obj_X), determined at step 206, to coordinates on the front-view image obtained at step 201 and sets an image processing or display region (disp_obj_YA, disp_obj_YB, disp_obj_XL, disp_obj_XR), which may be expressed as:

$$disp\_obj\_YA = yo + \text{focus}V \cdot \text{CAM}\_h2/obj\_Y \tag{10}$$

$$disp\_obj\_YB = yo + \text{focus}V \cdot \text{CAM}\_h/obj\_Y \tag{11}$$

$$disp\_obj\_XL = xo + \text{focus}H \cdot obj\_X/obj\_Y - \text{focus}H \cdot \text{ProcessWide}/obj\_Y \tag{12}$$

$$disp\_obj\_XR = xo + \text{focus}H \cdot obj\_X/obj\_Y + \text{focus}H \cdot \text{ProcessWide}/obj\_Y \tag{13}$$

In these equations, the denotation disp_obj_YA represents an upper vertical coordinate of an upper side of the image processing region, the denotation disp_obj_YB represents a lower vertical coordinate of a lower side of the image processing region, the denotation disp_obj_XL represents a left-hand horizontal coordinate of a left-hand side of the image processing region, and the denotation disp_obj_XR represents a right-hand horizontal coordinate of a right-hand side of the image processing region. The denotation yo [pixels] represents a vertical coordinate of a vanishing point and the denotation xo [pixels] represents a horizontal coordinate of the vanishing point. The vanishing point may be regarded as a parameter determined by the mount position of the camera 3 and the direction thereof. The denotations focusV and focusH represent a vertical component value and a horizontal component value of the focal distance of the camera 3 expressed in terms of a number of pixels. The focusV and focusH are parameters determined by the camera angle and the resolution power of the photo receiving device. If the photo receiving face is a square lattice, the relationship that focusV=focusH holds. The denotation CAM_h represents the height [m] of the mount position of the camera 3. The denotation CAM_h2 represents a value resulting from subtracting the height of an obstacle to be considered as a candidate for the preceding vehicle from CAM_h. The denotation ProcessWide represents a parameter that determines a width of the image processing region. The ProcessWide is a value [m] less than the width of the own vehicle and, in this exemplary embodiment, 1.4 [m]. The relationship that CAM_h−CAM_h2<<ProcessWide holds.

At step 208, the recognizing unit 5 carries out edge detecting processing by, for example, following steps (a) to (d) in this order to extract features out of the image processing region just set at step 207.

Step (a): In image analysis within the image processing region, the recognizing unit 5 uses a Sobel filter (i.e., computation of the first derivative, which assumes that a jump in intensity at a local maximum is an edge) for edge detection to give an edge image showing edges which characterize object boundaries. Step (b): The recognizing unit 5 establishes a threshold value out of the average and dispersion of intensity at the edges to threshold the edge image into a bilevel image. The bilevel image may be called an edge map because it clearly shows edges. These edges include vertically elongate edges and horizontally elongate edges. Step (c): Among the clarified edges, the vertically elongate edges are collected as a set VertEdge, leaving the horizontally elongate edges as they are. Step (d): Among the clarified edges, the horizontally elongate edges are collected as a set HoriEdge.

At step 209, the recognizing unit 5 compares the extracted feature to criteria to form an object to be determined as the preceding vehicle in front of the own vehicle by following, for example, steps (e) to (g).

Step (e): Using the object point obj_Y, the recognizing unit 5 determines the widest limit obj_Wf of a width of the preceding vehicle to be detected and the narrowest limit obj_Wn of the width of the preceding vehicle to be detected. The widest limit obj_Wf and the narrowest limit obj_Wn may be expressed in terms of the number of pixels as:

$$obj\_Wn=(focusH \cdot pWn)/obj\_Y \quad (14)$$

$$obj\_Wf=(focusH \cdot pWf)/obj\_Y \quad (15)$$

In the equations (14) and (15), the denotations pWn and pWf represent the widest and narrowest limits of a width of a vehicle, which is to be detected, respectively. In this exemplary embodiment, pWn=1.0 [m], and pWf=2.5[m].

Step (f): The recognizing unit 5 searches the set VertEdge of vertical edges to find at least a pair of vertical edges falling in a range defined between the widest and narrowest limits obj_Wn and obj_Wf. A horizontal coordinate of, on the image, a left-hand one of the vertical edges belonging to the pair is stored as CarCanEdge_Left, and a horizontal coordinate of a right-hand one of the vertical edges belonging to the same pair is stored as CarCanEdge_Right. What is mentioned above may be expressed as:

$$BodySpace=CarCanEdge\_Right[i]-CarCanEdge\_Left[i] \quad (16)$$

$$obj\_Wn < BodySpace < obj\_Wf \quad (17)$$

In the equation (16), the denotation i represents an index assigned to a pair of vertical edges that satisfies the equation (17). Thus, the index i means a number of vehicles, within the image processing region, which may be regarded as candidates for the vehicle to be detected.

Step (g): The recognizing unit 5 searches the set HoriEdge of horizontal edges to find, with respect to each pair of vertical edges found at step (f), a horizontal edge that is disposed between and combined with the vertical edges belonging to the pair. For the combination of the horizontal edge with the vertical edges of the pair, the coordinate of the left-hand side is stored as CarEdge_L (the coordinate of a left-hand boundary of a region that may be detected as a vehicle), the coordinate of the right-hand side is stored as CarEdge_R (the coordinate of a right-hand boundary of the region that may be detected as the vehicle) and the coordinate of the bottom side is stored as CarEdge_B (the coordinate on the bottom boundary of the region that may be detected as the vehicle). What is mentioned above may be expressed as:

If (CarCanEdge_Left[*i*]<HoriEdge_x[*j*]<CarCanEdge_Right[*i*]){ (18)

CarEdge_L[k]=CarCanEdge_Left[i] (19)

CarEdge_R[k]=CarCanEdge_Right[i] (20)

CarEdge_B[k]=HoriEdge_x[*j*] (21)

k=k+1 (22)}

Combining CarEdge_L, CarEdge_R, and CarEdge_B makes detection of an edge pattern of the H-character type possible. In the circumstance, the reference character kbottom is set as the number of an index of CarEdge_B disposed at the lowermost of the image processing region. Then, combining CarEdge_L[kbottom], CarEdge_R[kbottom], and CarEdge_B[kbottom] makes a region with an outer periphery of an edge pattern of the U-character type. The denotation HoriEdge_x represents a horizontal coordinate of a horizontal edge. The denotation j means an index assigned to a horizontal edge. The denotation k means an index assigned to an image feature that is judged as a vehicle accounting for a combination of a horizontal edge with a pair of vertical edges. Equations (18) to (22) are calculated with respect to each of horizontal edges and each of vertical edges.

At step 210, the recognizing unit 5 determines whether or not the preceding vehicle is present by confirming whether or not the vehicle was detected at step 209. If it is confirmed that the vehicle was detected at step 209, the recognizing unit 5 interrupts scanning and the routine proceeds to step 212. If, at step 210, the recognizing unit 5 determines that the preceding vehicle is not present, the routine proceeds to step 211.

At step 211, the recognizing unit 5 allows the routine to go back to step 205 to continue longitudinal scanning if the following condition is satisfied. If not, the routine proceeds to step 213.

If (Loop<5) go to [step 205] (23)

At step 212, the recognizing unit 5 calculates the position of the detected preceding vehicle using the following equations and makes a shift of a state transition variable Mode from Mode=InitDetect (Detection Mode) to Mode=Tracking (Tracking Mode).

$$DetectObj\_tate=focusV \cdot CAM\_h/(CarEdge\_B[kk]-yo) \quad (24)$$

$$DetectObj\_yoko=[\{(CarEdge\_L[kk]+CarEdge\_R[kk])/2\}-xo] \cdot obj\_Y/focusH \quad (25)$$

$$DetectObj\_haba=(CarEdge\_R[kk]-CarEdge\_L[kk]) \cdot obj\_Y/focusH \quad (26)$$

The denotation kk means an index number assigned to the combination of a horizontal edge with a pair of vertical edges, which makes the widest region. This selection enables the detection of the overall of a vehicle by avoiding the detection of a part of a vehicle in the case where a plurality of vehicles is present within an image procession region.

At step 213, the recognizing unit 5 terminates the present image processing for detection of the preceding vehicle.

Figure 4:
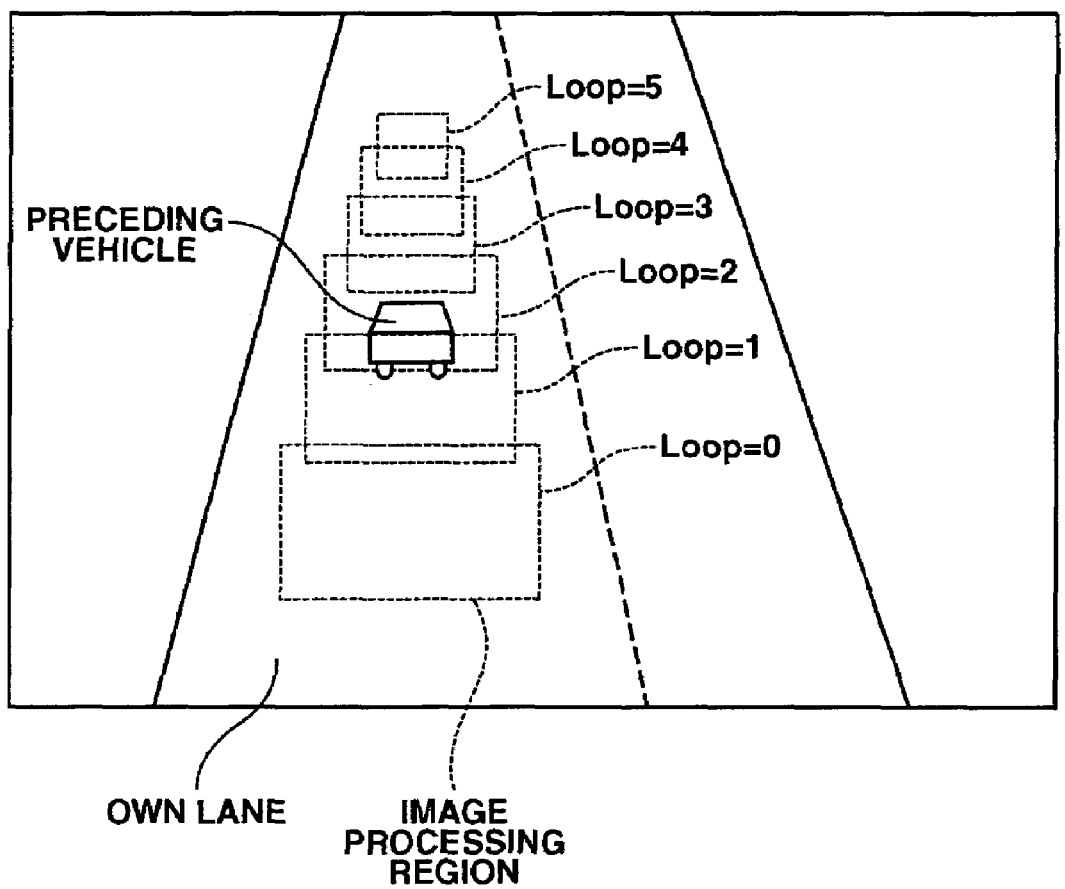
FIG. 4 is a view of a front-view image illustrating how to set image processing regions on the front-view image according to the first exemplary embodiment.

FIGS. 3(*a*) to 3(*c*) and FIG. 4 illustrate how to set an image processing region according to the first exemplary embodiment. In FIG. 3(*a*), at moment t [s], a front-view image picked up by the camera 3 is received as input, and an object point for setting an image processing region jumps a plurality (six in this embodiment) of positions equidistant by Ky [m] in equation (6) one after another from the nearest position in front of an own vehicle (Loop=0) in a longitudinal forward direction. As shown in FIG. 4, the image processing region set at the object point reduces in area as the object point jumps the plurality of positions one after another in the longitudinal forward direction so that the area of the image processing region is the maximum when the object point stays at the nearest position in front of the own vehicle. In FIG. 3(*b*), at moment t+0.05 [s], another front-view image picked up by the camera 3 is received as input, and an object point for setting an image processing region jumps a plurality (six in this embodiment) of equidistant positions one after another from a laterally displaced position to the right from the nearest position in front of the own vehicle in a longitudinal forward direction. The image processing region set at the object point reduces in area as the object point jumps the plurality of positions one after another in the longitudinal forward direction so that the area of the image processing region is the maximum when the object point stays at the laterally displaced position to the right from the nearest position in front of the own vehicle. In FIG. 3(c), at moment t+0.10 [s], another front-view image picked up by the camera 3 is received as input, and an object point for setting an image processing region jumps a plurality (six in this embodiment) of equidistant positions one after another from a laterally displaced position to the left from the nearest position in front of the own vehicle in a longitudinal forward direction. The image processing region set at the object point reduces in area as the object point jumps the plurality of positions one after another in the longitudinal forward direction so that the area of the image processing region is the maximum when the object point stays at the laterally displaced position to the right from the nearest position in front of the own vehicle.

In an aspect of this working example/embodiment, the calculation time for image processing and detecting obstacles in front of the own vehicle is reduced. This is accomplished by employing small image processing regions and/or scanning selected regions of the image captured by the camera 10. This is also accomplished by employing smaller and smaller regions as shown in FIG. 4. By reducing the size and/or quantity of regions to be image processed, the calculation time for detecting obstacles in front of the own vehicle is reduced. This allows faster detection of obstacles in front of the own vehicle in comparison to image processing the entire image captured by the camera 10.

In a further aspect of this working example/embodiment, the future position of the own vehicle and the preceding vehicle may be estimated. For example, a future position of the own vehicle may be estimated from the steering angle and vehicle speed of the own vehicle, or the position of the own vehicle may be estimated from the curvature of the road. The curvature of the road may be known by a vehicle navigation system on board the own vehicle.

A future position of a preceding vehicle may also be determined. For example, the image captured by camera 10 may be processed to determine the direction that the preceding vehicle is traveling in, or a future position may be estimated from the curvature of the road, which is known by a vehicle navigation system. In another example, a vector for the preceding vehicle may be calculated to determine a future position of the preceding vehicle.

In a further aspect of this working example/embodiment, image processing regions may be selected on the basis of a determined future position of the own vehicle and/or preceding vehicle. For example, image processing regions may be selected upon the basis of a future position of the own vehicle so that image scanning is conducted upon the path or region that the own vehicle will travel in. In this way, estimating a future position of the own vehicle directs image processing, resulting in "smart scanning" of the image captured by the camera 10 so that image regions corresponding to a predicted future position of the own vehicle are scanned. Such scanning based upon a future position of the own vehicle may be used in conjunction with the scanning patterns described previously or in alternative to the scanning patterns described previously. In another example, image processing regions may be selected upon the basis of an estimated future position of a preceding vehicle. In this way, estimating a future position of a preceding vehicle directs image processing, resulting in "smart scanning" of the image captured by the camera 10 so that an area of the image corresponding to a predicted future position of a preceding vehicle is scanned. Image processing regions may be selected on the basis of a future position of the own vehicle, on the basis of a future position of a preceding vehicle, or on the basis of both the future position of the own vehicle and the future position of the preceding vehicle.

The first exemplary embodiment provides high performance vehicle detection using a single camera. This high performance has been accomplished by reducing an image processing region to enable reliable vehicle detection even under bad weather conditions. The first exemplary embodiment restrains an increase in arithmetic operation load on a CPU due to high speed longitudinal scanning of image processing regions by having areas reducing in the longitudinal forward direction. Further, the first exemplary embodiment can avoid recognition of a scene around a vehicle because the image processing regions have small areas excluding the scene.

SECOND EXEMPLARY EMBODIMENT

As described above, the first exemplary embodiment carries out a longitudinal scanning on a front-view image picked up by a camera and repeats a longitudinal scanning on an updated or another front-view image picked up by the camera after making a lateral scanning or shift. With a high-speed CPU having sufficient capability, a front-view image hardware picked up by a camera may be subject to a simultaneous longitudinal and lateral scanning according to the second exemplary embodiment. The second exemplary embodiment is substantially the same as the first exemplary embodiment in configuration as shown in FIG. 1. The description of the hardware configuration of the second exemplary embodiment is hereby omitted.

Figure 5:
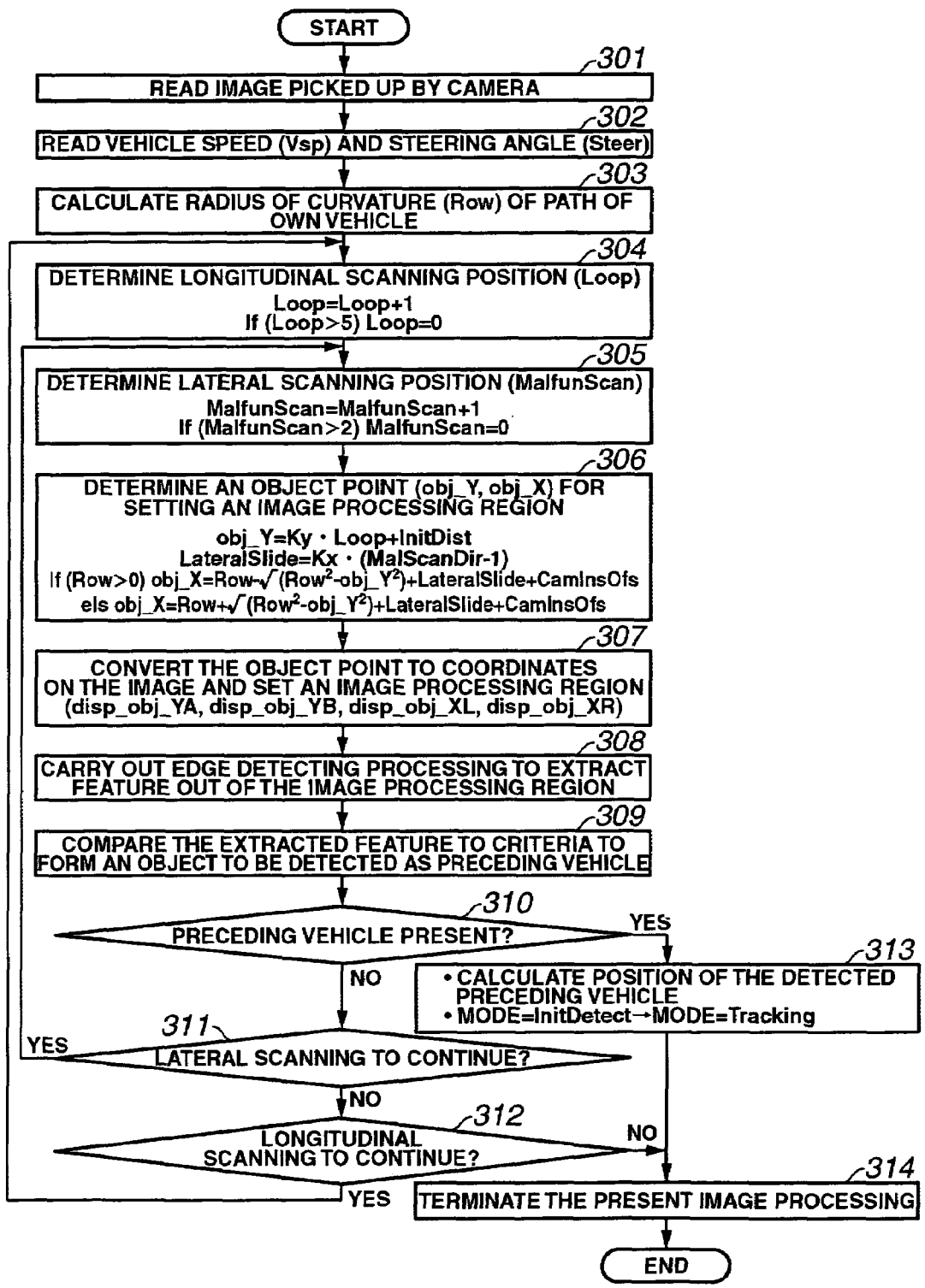
FIG. 5 is a flow chart illustrating operation of a second exemplary embodiment of an image processing system and method according to the present invention.

The flow chart in FIG. 5 illustrates operation of the second exemplary embodiment. An external world recognizing unit 5 repeats execution of vehicle detection at regular intervals, i.e., for example, 50 milliseconds.

In FIG. 5, steps 301, 302 and 303 correspond exactly to the before mentioned steps 201, 202 and 203 shown in FIG. 2, respectively. For brevity, further description on these steps is hereby omitted. After step 303, the routine proceeds to step 304. This step 304 corresponds exactly to the before mentioned step 205 shown in FIG. 2. For brevity, further description on this step 304 is hereby omitted. After step 304, the routine proceeds to step 305. This step 305 corresponds exactly to the before mentioned step 204 shown in FIG. 2. For brevity, further description on this step 305 is hereby omitted. After step 305, the routine proceeds to step 306 and then to step 307. The steps 306 and 307 correspond exactly to the before mentioned steps 206 and 207 shown in FIG. 2. After step 307, the routine proceeds to step 308.

At step 308, the recognizing unit 5 carries out edge detecting processing by, for example, following steps (a) to (d') in this order to extract features out of the image processing region just set at step 307.

Step (a): In image analysis within the image processing region, the recognizing unit 5 uses a Sobel filter (i.e., computation of the first derivative, which assumes that a jump in intensity is a local maximum at an edge) for edge detection to give an edge image showing edges which characterize object boundaries. Step (b): The recognizing unit 5 establishes a threshold value out of the average and dispersion of intensity at the edges to threshold the edge image into a bilevel image. The bilevel image may be called an edge map because it clearly shows edges. These edges include vertically elongate edges and horizontally elongate edges.

Step (c'): Among the clarified edges, the vertically elongate edges are collected as a set VertEdge. Among the vertical edges of the set VertEdge, only such vertical edges that satisfy the condition expressed by the following equations are collected as a set VertEdge_Height.

$$vEdgeLength\_S = (focus V \cdot pHs)/obj\_Y \quad (27)$$

$$vEdgeLength\_T = (focus V \cdot pHt)/obj\_Y \quad (28)$$

$$vEdgeLength\_S < VertEdge\_Height < vEdgeLength\_T \quad (29)$$

The denotations pHs and pHt represent limits defining a range of lengths [m] of an edge that is to be extracted. For example, pHs=0.3 m and pHt=1.0 m. A set VertEdge_Height is a subset of the set VertEdge and includes the vertical edges having lengths satisfying the relationship expressed by the equations (27), (28) and (29).

Step (d'): Among the clarified edges, the horizontally elongate edges are collected as a set HoriEdge. Among the horizontal edges of the set HoriEdge, only such horizontal edges that satisfy the condition expressed by the following equations are collected as a set HoriEdge_Length.

$$hEdgeLength\_n = (focus H \cdot pW1)/obj\_Y \quad (30)$$

$$hEdgeLength\_w = (focus H \cdot pW2)/obj\_Y \quad (31)$$

$$hEdgeLength\_n < HoriEdge\_Length < hEdgeLength\_w \quad (32)$$

The denotations pW1 and pW2 represent limits defining a range of lengths [m] of an edge that is to be extracted. For example, pW1=0.4 m and pW2=2.5 m. A set HoriEdge_Length is a subset of the set HoriEdge and includes the horizontal edges having lengths satisfying the relationship expressed by the equations (30), (31) and (32).

After step 308, the routine proceeds to step 309 and then to step 310. The steps 309 and 310 correspond exactly to the before mentioned steps 209 and 210 shown in FIG. 2, respectively. For brevity, further description on these steps 309 and 310 is hereby omitted.

At the next step 311, the recognizing unit 5 allows the routine to go back to step 305 to continue lateral scanning if the following condition is satisfied. If not, the routine proceeds to step 313.

$$\text{If } (MalfunScan<2) \text{ go to [step 305]} \quad (33)$$

At the next step 312, the recognizing unit 5 allows the routine to go back to step 304 to continue longitudinal scanning if the condition that Loop<5 is satisfied. If not, the routine proceeds to step 314.

The steps 313 and 314 correspond exactly to the before mentioned steps 212 and 213 shown in FIG. 2, respectively.

Figure 6:
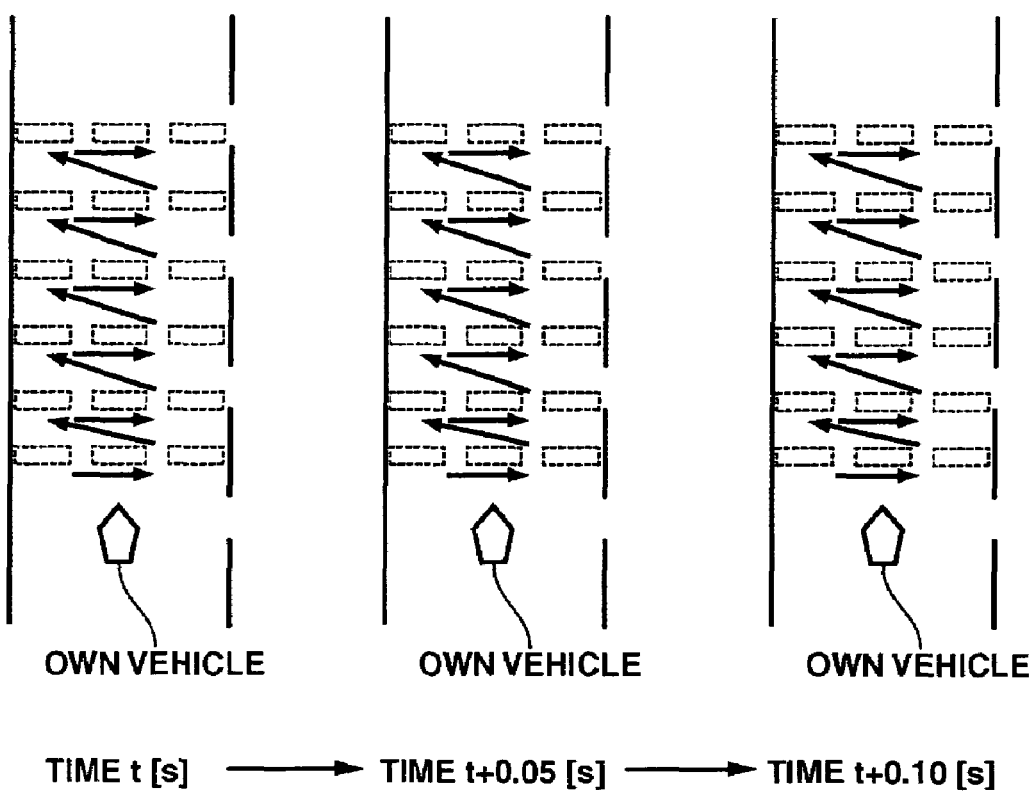
FIGS. 6(a) to 6(c) are views illustrating how to arrange object points for setting image processing regions according to the second exemplary embodiment.

FIGS. 6(a) to 6(c) illustrate how to set an image processing region according to the second exemplary embodiment. In FIG. 6(a), at moment t [s], a front-view image picked up by a CCD camera 3 (see FIG. 1) is received as input, and an object point for setting an image processing region jumps a laterally displaced position to the left, to a central position in front and then to a laterally displaced position to the right one after another. After this lateral movement, the object point moves by a distance Ky [m] in a longitudinal forward direction for another lateral movement. As illustrated by arrows in FIG. 6(a), the lateral movement of the object point is repeated after the longitudinal movement by the distance Ky. As shown in FIG. 4, the image processing region set at the object point reduces in area as the object point jumps the plurality of positions one after another in the longitudinal forward direction so that the area of the image processing region is the maximum when the object point stays at the positions nearest to the own vehicle. In FIG. 6(b), at moment t+0.05 [s], another front-view image picked up by the camera 3 is received as input, and the lateral movement of the object point is repeated after the longitudinal movement by the distance Ky as illustrated by arrows in FIG. 6(b). In FIG. 6(c), at moment t+0.10 [s], another front-view image picked up by the camera 3 is received as input, and the lateral movement of the object point is repeated after the longitudinal movement by the distance Ky as illustrated by arrows in FIG. 6(c).

The second exemplary embodiment provides high performance vehicle detection using a single camera. That is, time required for vehicle detection has been shortened because, with a high speed CPU, a front-view image picked by the single camera is subject to scanning in lateral and longitudinal directions. Besides, the second exemplary embodiment provides a reduced frequency of no or erroneous vehicle detection because the length of a vertical edge and the length of a horizontal edge are defined depending upon the distance (obj_Y) from the own vehicle.

THIRD EXEMPLARY EMBODIMENT

In each of the first and second exemplary embodiments, the longitudinal scanning is carried out at equidistant intervals and the lateral scanning is carried out in only one direction. The third exemplary embodiment carries out longitudinal scanning at object points spaced a distance that is proportional to a vehicle speed of an own vehicle and a distance from the own vehicle, and it carries out lateral scanning in one and the opposite direction alternatively. The third exemplary embodiment is substantially the same as the first exemplary embodiment in hardware configuration as shown in FIG. 1. The description of the configuration of the third exemplary embodiment is hereby omitted.

Figure 7:
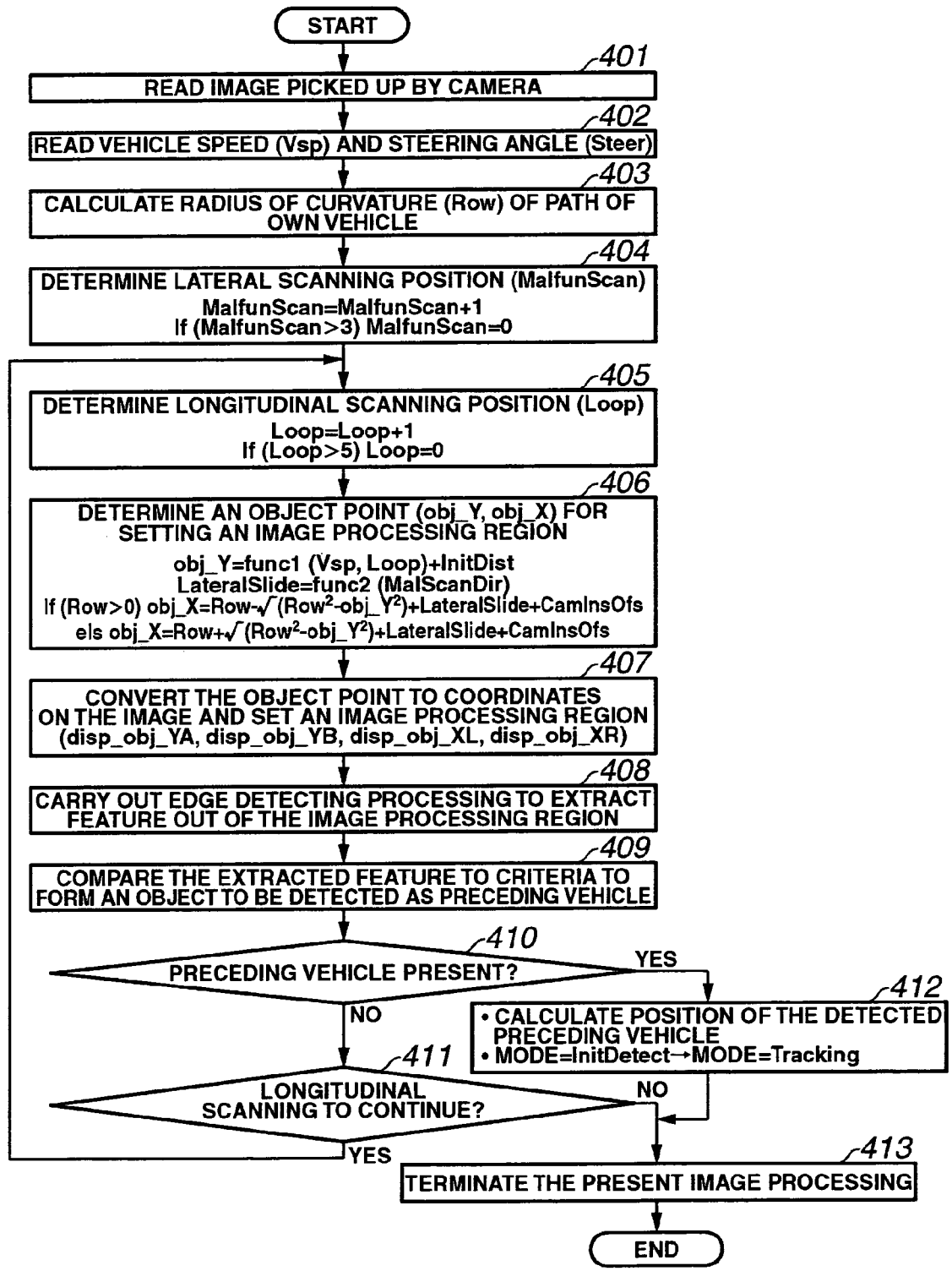
FIG. 7 is a flow chart illustrating operation of a third exemplary embodiment of an image processing system and method according to the present invention.

The flow chart in FIG. 7 illustrates operation of the third exemplary embodiment. An external world recognizing unit 5 repeats execution of vehicle detection at regular intervals, i.e., for example, 50 milliseconds.

In FIG. 7, steps 401, 402 and 403 correspond exactly to the before mentioned steps 201, 202 and 203 shown in FIG. 2, respectively. For brevity, further description on these steps is hereby omitted. After step 403, the routine proceeds to step 404. This step 404 corresponds to the before mentioned step 204 shown in FIG. 2 except for the use of the following equation (3') instead of the equation (3).

$$\text{If (MalfunScan>3) MalfunScan=0} \quad (3')$$

After step 404, the routine proceeds to step 405. The step 405 corresponds exactly to the before mentioned step 205 shown in FIG. 2. For brevity, further description on the step 405 is hereby omitted.

After the step 405, the routine proceeds to step 406. The step 406 corresponds to the before mentioned step 205 except for the use of the following equations (34) and (35) instead of the equations (6) and (7).

$$obj\_Y = func1(Vsp, \text{Loop}) + InitDist \quad (34)$$

$$LateralSlide = func2(MalScanDir) \quad (35)$$

Figure 9:
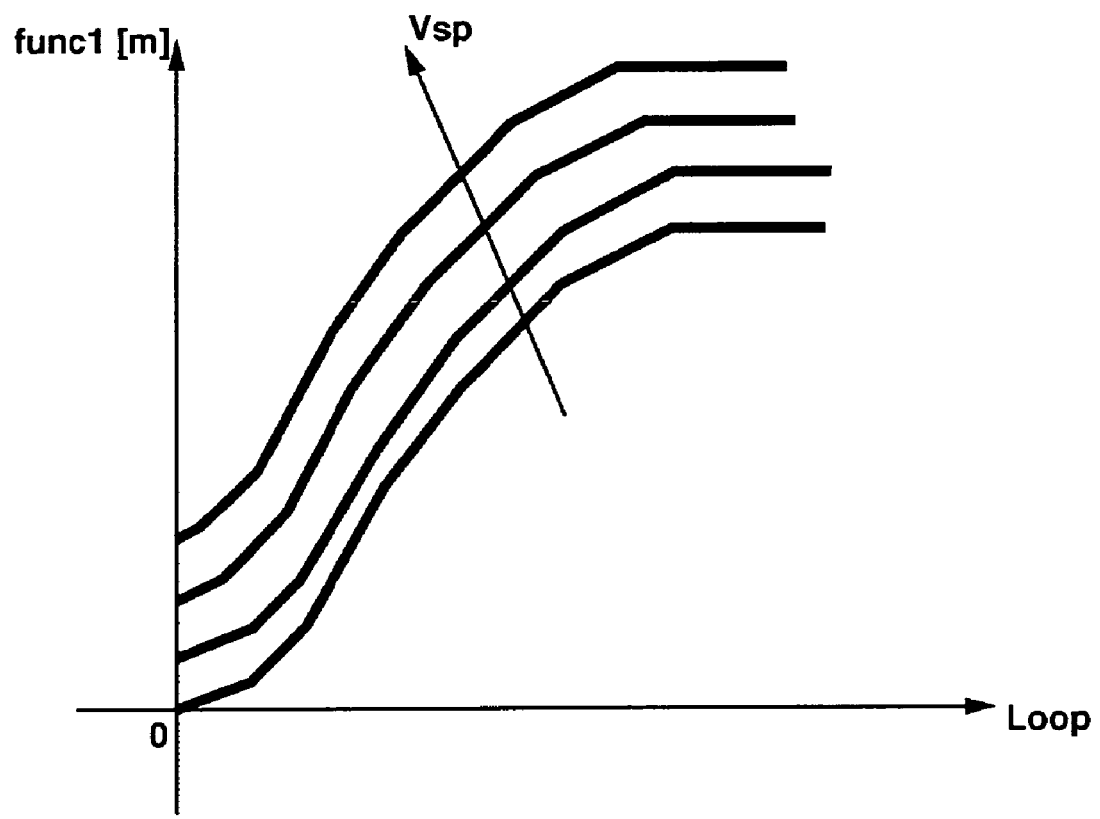
FIG. 9 is a graphical representation of varying of a function, func1, with different values of a variable, Loop, using a vehicle speed, Vsp, as a parameter.
Figure 10:
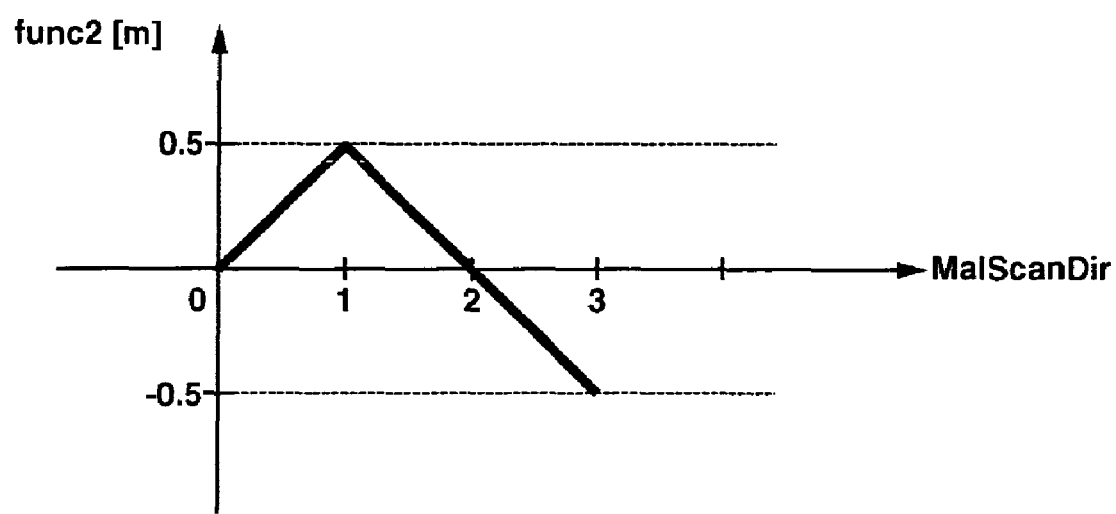
FIG. 10 is a graphical representation of varying of a function, func2, with different values of a variable, MalScanDir.

In the equations (34) and (35), func1 and func2 are functions that provide the illustrated characteristics in FIGS. 9 and 10. As shown in FIG. 9, func1 becomes large as vehicle speed Vsp of the own vehicle becomes high, and it becomes large as Loop becomes large, i.e., as a distance from the own vehicle becomes long. Therefore, the scan distance for longitudinal scanning becomes wide as the vehicle speed Vsp becomes high and the distance from the own vehicle becomes long. As shown in FIG. 10, func2 takes 0, +0.5, 0, −0.5, 0 . . . as counter MalScanDir counts up 0, 1, 2, 3, 4 . . . . Therefore, the lateral slide LateralSlide is proportional to the function func2 for controlling lateral scanning.

After step 406, the routine proceeds to step 407 and step 408. The steps 407 and 408 correspond exactly to the before mentioned steps 307 and 308 shown in FIG. 5. For brevity, further description on the steps 407 and 408 is hereby omitted.

After step 408, the routine proceeds to steps 409 to 413. The steps 409 to 413 correspond exactly to steps 209 to 213 shown in FIG. 2, respectively. For brevity, further description on the steps 409 to 413 is hereby omitted.

Figure 8A:
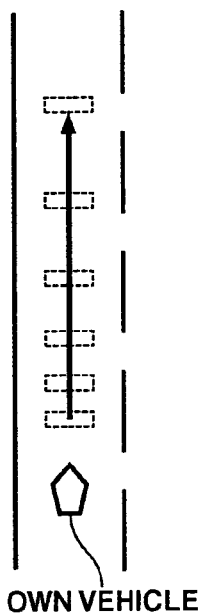
FIGS. 8(a) to 8(f) are views illustrating how to arrange object points for setting image processing regions according to the third exemplary embodiment.
Figure 8B:
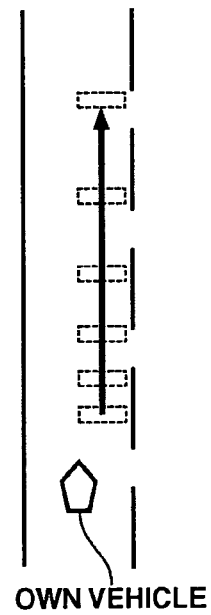
Figure 8C:
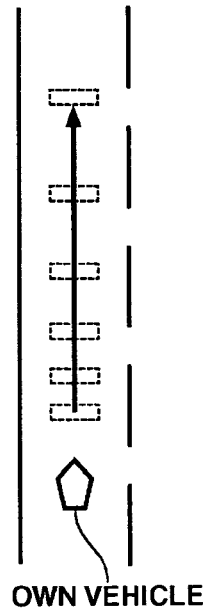
Figure 8D:
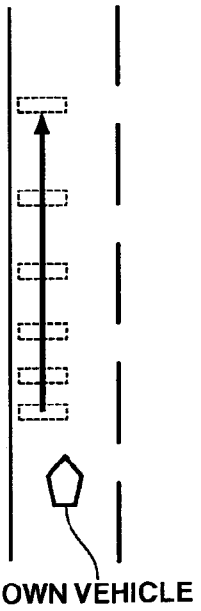
Figure 8E:
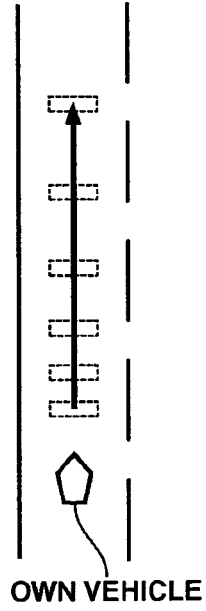
Figure 8F:
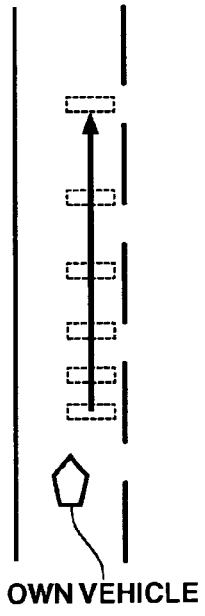

FIGS. 8(a) to 8(f) illustrate how to set an image processing region according to the third exemplary embodiment. In FIG. 8(a), at moment t [s], a front-view image picked up by a CCD camera 3 (see FIG. 1) is received as input, and object points, each for setting an image processing region, are set at positions arranged, in a longitudinal forward direction from a center position in front of an own vehicle, at varying intervals of space with different values of a vehicle speed Vsp of the own vehicle in an increasing direction and with different values of distance from the own vehicle in an increasing direction. As shown in FIG. 4, the image processing region reduces in area as the object point jumps the positions one after another in the longitudinal forward direction so that the area of the image processing region is the maximum when the object point is at the center position nearest to the own vehicle. In FIG. 8(b), at the subsequent moment t+0.05 [s], another front-view image is received as input, and the object points, each for setting an image processing region, are set at positions arranged, in a longitudinal forward direction from a displaced position to the right from the center position in front of the own vehicle, at varying intervals of space with different values of a vehicle speed Vsp of the own vehicle in an increasing direction and with different values of distance from the own vehicle in an increasing direction. The image processing region reduces in area as the object point jumps the positions one after another in the longitudinal forward direction. In FIG. 8(c), at moment t+0.1 [s], another front-view image is received as input, and the object points, each for setting an image processing region, are set at positions arranged, in a longitudinal forward direction from the center position in front of the own vehicle, at varying intervals of space with different values of a vehicle speed Vsp of the own vehicle in an increasing direction and with different values of distance from the own vehicle in an increasing direction. The image processing region reduces in area as the object point jumps the positions one after another in the longitudinal forward direction. In FIG. 8(d), at the subsequent moment t+0.15 [s], another front-view image is received as input, and the object points, each for setting an image processing region, are set at positions arranged, in a longitudinal forward direction from a displaced position to the left from the center position in front of the own vehicle, at varying intervals of space with different values of the vehicle speed Vsp in an increasing direction and with different values of distance from the own vehicle in an increasing direction. The image processing region reduces in area as the object point jumps the positions one after another in the longitudinal forward direction. In FIG. 8(e), at moment t+0.2 [s], another front-view image is received as input, and the object points, each for setting an image processing region, are set at positions arranged, in a longitudinal forward direction from the center position in front of the own vehicle, at varying intervals of space with different values of the vehicle speed Vsp in an increasing direction and with different values of distance from the own vehicle in an increasing direction. The image processing region reduces in area as the object point jumps the positions one after another in the longitudinal forward direction. In FIG. 8(f), at the subsequent moment t+0.25 [s], another front-view image is received as input, and the object points, each for setting an image processing region, are set at positions arranged, in a longitudinal forward direction from the displaced position to the right from the center position in front of the own vehicle, at varying intervals of space with different values of the vehicle speed Vsp in an increasing direction and with different values of distance from the own vehicle in an increasing direction. The image processing region reduces in area as the object point jumps the positions one after another in the longitudinal forward direction.

The third exemplary embodiment provides high performance vehicle detection with a single camera. The scanning intervals of space become wide as the vehicle speed becomes high and the distance becomes long so that they vary in perspective of the front-view image picked up by the camera. As a result, threshold values on the front-view image vary in good balance.

As the lateral scanning is carried out in one direction and the opposite direction, the amount of lateral scanning from the center position in front of the vehicle has increased. Under bad weather conditions, there is a growing tendency that the vehicle travels near the centerline of a lane because it is difficult to recognize the lane boundaries. An increase in the amount of longitudinal scanning from the center position in front of the own vehicle can shorten time required for vehicle detection.

FOURTH EXEMPLARY EMBODIMENT

In each of the first to third exemplary embodiments, the number of object points, each for setting an imaginary processing region, is constant for longitudinal scanning. According to the fourth exemplary embodiment, the number of object points may vary. The fourth exemplary embodiment is substantially the same as the first exemplary embodiment in hardware configuration as shown in FIG. 1. The description of the configuration of the fourth exemplary embodiment is hereby omitted.

Figure 11:
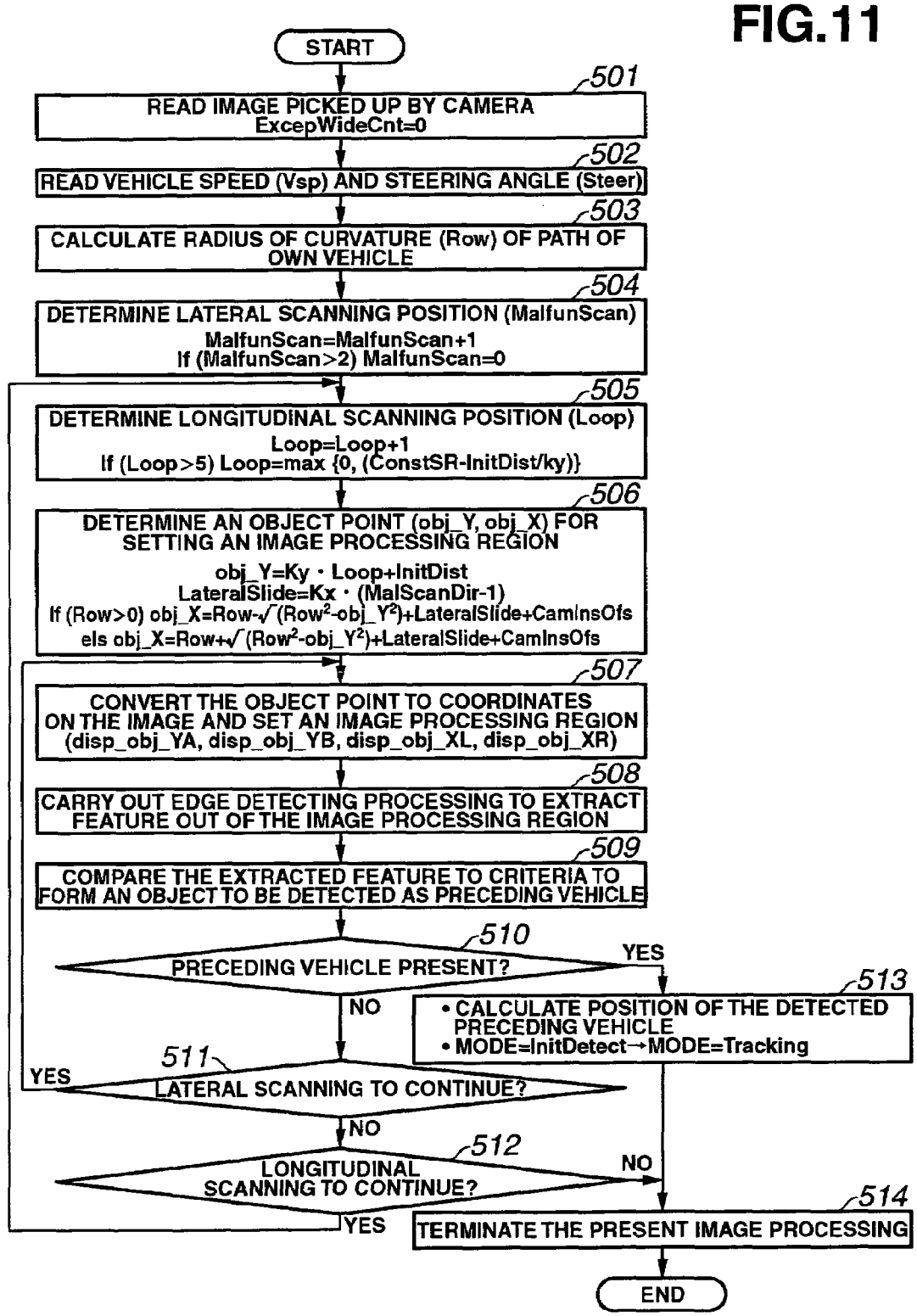
FIG. 11 is a flow chart illustrating operation of a fourth exemplary embodiment of an image processing system and method according to the present invention.

The flow chart in FIG. 11 illustrates operation of the fourth exemplary embodiment. An external world recognizing unit 5 repeats execution of vehicle detection at regular intervals, i.e., for example, 50 milliseconds.

In FIG. 11, at step 501, the recognizing unit 5 reads a front-view image picked up by a CCD camera 3. In addition to this operation, a flag ExcepWideCnt is cleared to zero when the capacity of image processing is low. This flag ExcepWideCnt is provided to increase the number of object points during lateral scanning. After step 501, the routine proceeds to steps 502, 503 and 504. The steps 502, 503 and 504 correspond exactly to the before mentioned steps 202, 203 and 204 shown in FIG. 2. For brevity, further description on these steps 502 to 504 is hereby omitted. After step 504, the routine proceeds to step 505.

The step 505 corresponds to the before mentioned step 205 shown in FIG. 2 except the use of the following equation (36) in addition to the equation (5).

$$\text{If (Loop>5) Loop=max } \{0, (\text{ConstSR}-\text{InitDist})/Ky\} \quad (36)$$

The function max (A, B) means selecting a greater one of A and B. The denotation ConstSR represents a length [m] when an image processing region is set at the nearest position to an own vehicle. For example, ConstSR is equal to 10 [m] and InitDist is equal to 0 [m] on the assumption that a vehicle speed Vsp of the own vehicle is 0 [m/s]. For example, if the scanning interval of space Ky is 5 [m], Loop=2 holds in equation (36). Per each longitudinal scanning, Loop $\in$ [2, 5], so that the number of object points reduce from 6 to 4. In other words, instead of scanning Loop positions 0, 1, 2, 3, 4, 5 only Loop positions 2, 3, 4, 5 are scanned.

After step 505, the routine proceeds to step 506 and then to step 507. The steps 506 and 507 correspond exactly to the before mentioned steps 206 and 207 shown in FIG. 2. For brevity, further description of the steps 506 and 507 is hereby omitted. After step 507, the routine proceeds to step 508. The step 508 corresponds exactly to the before mentioned step 308 shown in FIG. 5. For brevity, further description on the step 508 is hereby omitted. After step 508, the routine proceeds to steps 509 and 510. The steps 509 and 510 correspond exactly to the before mentioned steps 209 and 210 shown in FIG. 2. For brevity, further description of the steps 509 and 510 is hereby omitted.

After step 510, the routine proceeds to step 511. At step 511, the recognizing unit 5 (see FIG. 1) increases the number of object points, each for setting an imaginary processing region, for lateral scanning if the following condition is satisfied.

If (obj_$Y$>Const$LR$) {  (37)

If (ExcepWide$Cnt$=0) {  (38)

ExceptWideCnt=1  (39)

LateralSlide=$Kx$·($Mal$Scan$Dir$−1)−$Kx$/2  (40)

If (Row>0)obj_$X$=Row−
$\sqrt{(\text{Row}^2-\text{obj}\_Y^2)}$+LateralSlide+CamIns0$fs$  (8)

else obj_$X$=Row+
$\sqrt{(\text{Row}^2-\text{obj}\_Y^2)}$+LateralSlide+CamIns0$fs$  (9)

go to [step 507]}

If (ExcepWideCnt=1 {  (41)

ExceptWideCnt=2  (42)

LateralSlide=$Kx$·($Mal$Scan$Dir$−1)+$Kx$/2  (43)

If (Row>0)obj_$X$=Row−
$\sqrt{(\text{Row}^2-\text{obj}\_Y^2)}$+LateralSlide+CamIns0fs  (8)

else obj_$X$=Row+
$\sqrt{(\text{Row}^2-\text{obj}\_Y^2)}$+LateralSlide+CamIns0$fs$  (9)

go to [step 507]}}

The denotation ConstLR is a distance [m] beyond which the area of an image procession region drops below a predetermined value. Upon determination that the image processing capacity is low, space of intervals at which object points for setting image processing regions are arranged is wider by a half step than space of intervals at which object points for setting image processing regions are usually arranged for lateral scanning.

After step 511, the routine proceeds to steps 512, 513 and 514. The steps 512, 513 and 514 correspond exactly to the before mentioned steps 211, 212 and 213 shown in FIG. 2. For brevity, further description on the steps 512 to 514 is not described.

Figure 12:
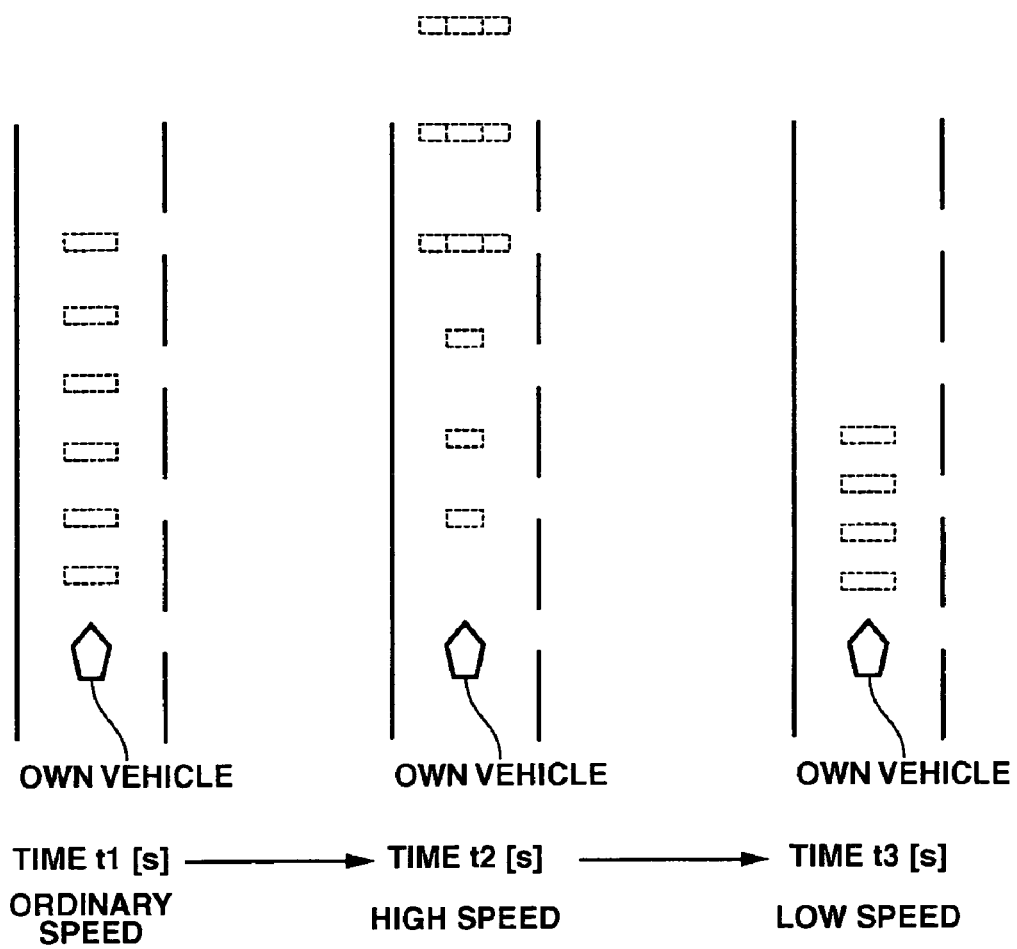
FIGS. 12(a) to 12(c) are views illustrating how to arrange for setting image processing regions according to the fourth exemplary embodiment.

FIGS. 12(*a*) to 12(*c*) illustrate how to set an image processing region according to the fourth exemplary embodiment. In FIG. 12(*a*), at moment t1 [s], as the own vehicle is traveling at ordinary vehicle speed, six object points are arranged for setting wide image processing regions to carry out longitudinal scanning. In FIG. 12(*b*), at moment t2 [s], the vehicle is traveling at high speed. Space of intervals at which object points for setting image processing regions are arranged increases as vehicle speed becomes high. The areas of image processing regions are narrow as vehicle speed is high. Besides, at remote distance from the own vehicle, the object points for setting image processing regions during lateral scanning increase because the areas of image processing regions are narrow. In FIG. 12(*c*), at moment t3 [s], the vehicle is traveling at low speed, the areas of image processing regions are wide and the object points for setting image processing regions during longitudinal scanning reduce in number.

The fourth exemplary embodiment has reduced the object points, in number, for setting image processing regions during longitudinal scanning when the image processing regions have wide areas. At low vehicle speed, the image processing regions have wide areas so that it is not necessary to carry out longitudinal scanning over a long distance. Thus, a reduction, in number, of object points for setting image processing regions has lowered the amount of arithmetic load on the CPU.

At high vehicle speed, the image processing regions have narrow areas. Within a reasonable range of causing an increase in arithmetic load on the CPU, an increase, in number, of object points for setting image processing regions provides enhanced response for vehicle detection.

FIFTH EXEMPLARY EMBODIMENT

In the first exemplary embodiment, a threshold value for vehicle detection is determined based on a distance to each object point for setting an image processing region. In the fifth exemplary embodiment, a threshold value for vehicle detection is determined based on coordinates of feature amount detected at each image processing region. The fifth exemplary embodiment is substantially the same as the first exemplary embodiment in hardware configuration as shown in FIG. 1. The description on the configuration of the fifth exemplary embodiment is hereby omitted.

Figure 13:
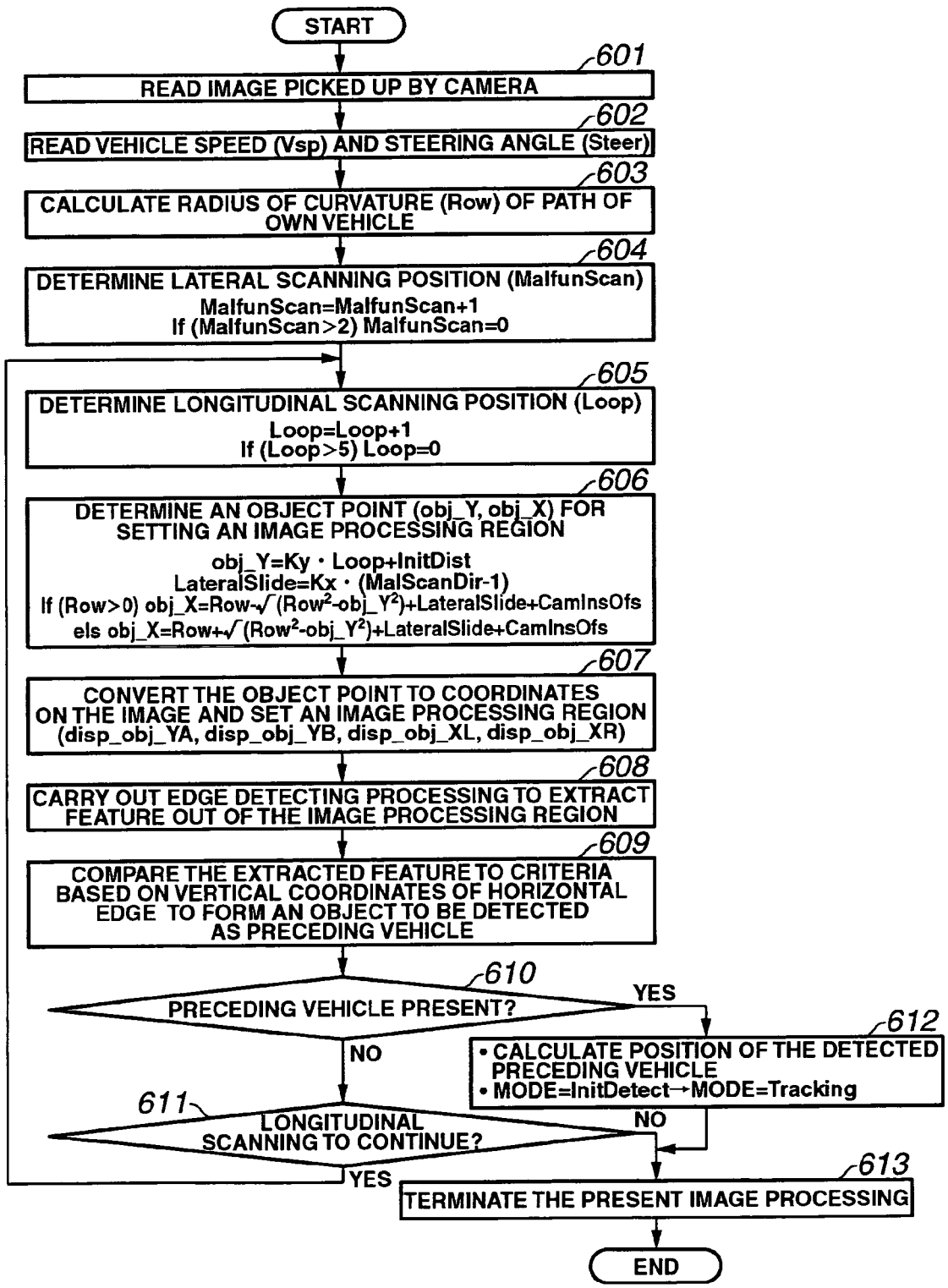
FIG. 13 is a flow chart illustrating operation of a fifth exemplary embodiment of an image processing system and method according to the present invention.

The flow chart in FIG. 13 illustrates operation of the fifth exemplary embodiment. An external world recognizing unit 5 repeats execution of vehicle detection at regular intervals, i.e., for example, 50 milliseconds.

Steps 601 to 607 in FIG. 13 correspond exactly to the before mentioned steps 201 to 207 shown in FIG. 2, respectively. For brevity, further description on the steps 601 to 607 is hereby omitted. After step 607, the routine proceeds to step 608. The step 608 corresponds exactly to the before mentioned step 308 shown in FIG. 5. For brevity, further description on the step 608 is hereby omitted. After step 608, the routine proceeds to step 609.

At step 609, the recognizing unit 5 compares the extracted feature, given at step 608, to criteria to form an object to be determined as the preceding vehicle in front of the own vehicle by following, for example, steps (h) to (k).

Step (h): The recognizing unit 5 refines the object point obj_Y given at step 606 by using the following equation:

If (HoriEdge_Numb>0) { obj_$Y$=focus$V$·CAM_$h$/(HoriEdge_Row[max_row]−
$yo$)  (44)}

Vertical coordinates of all of horizontal edges extracted at step 608 are collected as a set HoriEdge_Row. The denotation max_row represents an index number assigned to the vertical coordinates disposed near the lowest side of the image. This makes an edge of the U-character type. The denotation HoriEdge_Numb represents the number of the horizontal edges. If there is no horizontal edge, the value of the obj_Y remains equal to the value given by the equation (6).

Step (i): Using the object point obj_Y given at step (h), the recognizing unit 5 determines the widest limit obj_Wf of a width of the preceding vehicle to be detected and the narrowest limit obj_Wn of the width of the preceding vehicle to be detected. The widest limit obj_Wf and the narrowest limit obj_Wn may be expressed in terms of the number of pixels as:

$$obj\_Wn = (focusH \cdot pWn)/obj\_Y \quad (14)$$

$$obj\_Wf = (focusH \cdot pWf)/obj\_Y \quad (15)$$

Step (j): The recognizing unit 5 searches the set VertEdge of vertical edges to find at least a pair of vertical edges falling in a range defined between the widest and narrowest limits obj_Wn and obj_Wf. A horizontal coordinate of, on the image, a left-hand one of the vertical edges belonging to the pair is stored as CarCanEdge_Left, and a horizontal coordinate of a right-hand one of the vertical edges belonging to the same pair is stored as CarCanEdge_Right. What is mentioned above may be expressed as:

$$BodySpace = CarCanEdge\_Right[i] - CarCanEdge\_Left[i] \quad (16)$$

$$obj\_Wn < BodySpace < obj\_Wf \quad (17)$$

Step (k): The recognizing unit 5 searches the set HoriEdge of horizontal edges to find, with respect to each pair of vertical edges found at step (f), a horizontal edge that is disposed between and combined with the vertical edges belonging to the pair. For the combination of the horizontal edge with the vertical edges of the pair, the coordinate of the left-hand side is stored as CarEdge_L (the coordinate of a left-hand boundary of a region that may be detected as a vehicle), the coordinate of the right-hand side is stored as CarEdge_R (the coordinate of a right-hand boundary of the region that may be detected as the vehicle) and the coordinate of the bottom side is stored as CarEdge_B (the coordinate on the bottom boundary of the region that may be detected as the vehicle). What is mentioned above may be expressed as:

$$\text{If } (CarCanEdge\_Left[i] < HoriEdge\_x[j] < CarCanEdge\_Right[i]) \{ \quad (18)$$

$$CarEdge\_L[k] = CarCanEdge\_Left[i] \quad (19)$$

$$CarEdge\_R[k] = CarCanEdge\_Right[i] \quad (20)$$

$$CarEdge\_B[k] = HoriEdge\_x[j] \quad (21)$$

$$k = k+1 \quad (22)\}$$

After step 609, the routine proceeds to steps 610 to 613. The steps 610 to 613 correspond exactly to the before mentioned steps 210 to 213 shown in FIG. 2. For brevity, further description of the steps 610 to 613 is hereby omitted.

The fifth exemplary embodiment provides high performance vehicle detection with a single camera. This is because the threshold value used for vehicle detection is determined based on the coordinates of the extracted feature. The frequency of erroneous detection of scene and/or painting on the road as a vehicle has been lowered.

SIXTH EXEMPLARY EMBODIMENT

In the above-mentioned fifth exemplary embodiment, the threshold value for vehicle detection has been determined based on the coordinates of the extracted feature. In the sixth exemplary embodiment, the threshold value for vehicle detection is determined based on the length of the extracted feature. The sixth exemplary embodiment is substantially the same as the first exemplary embodiment in hardware configuration as shown in FIG. 1. The description on the configuration of the sixth exemplary embodiment is hereby omitted.

Figure 14:
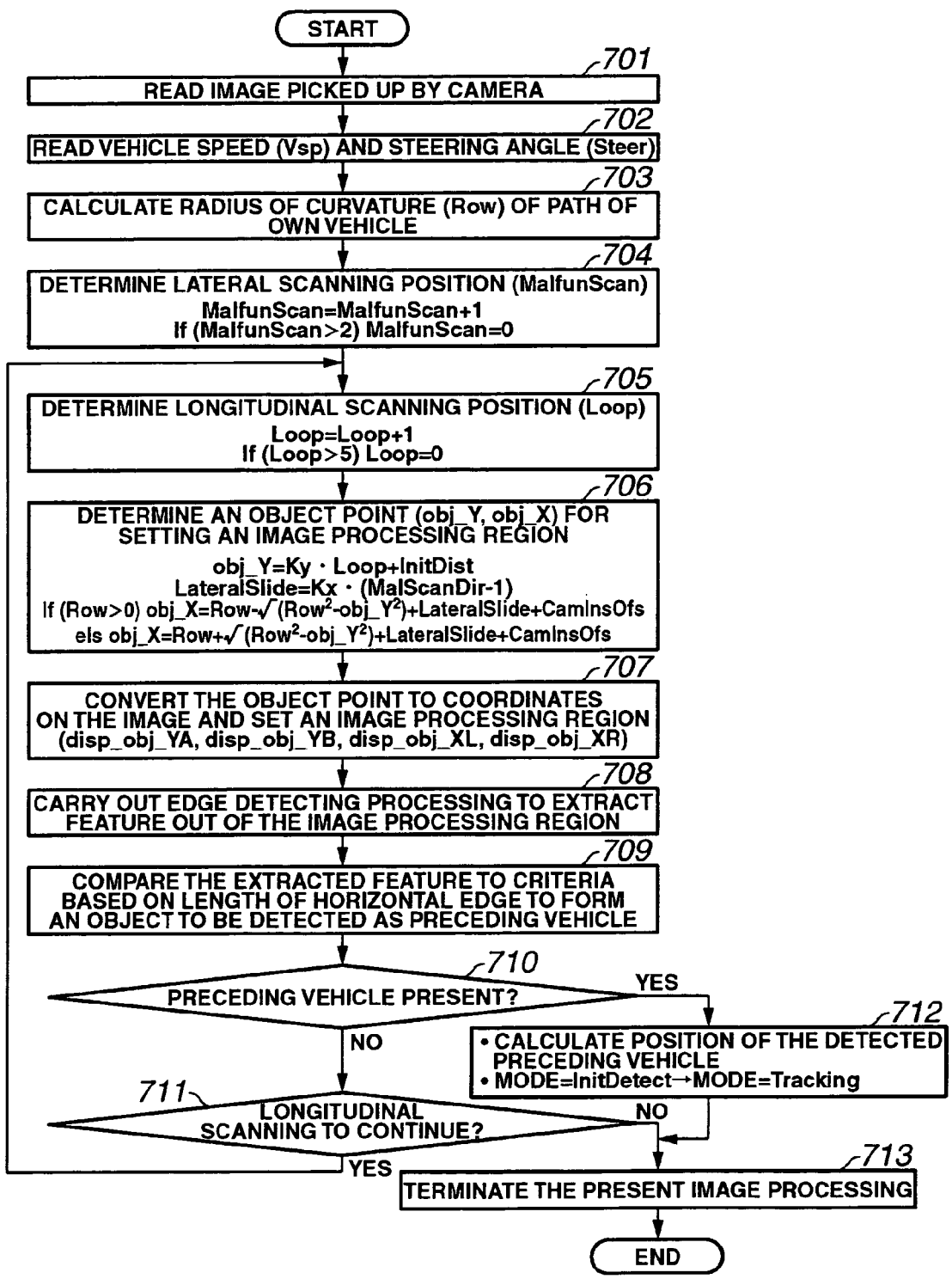
FIG. 14 is a flow chart illustrating operation of a seventh exemplary embodiment of an image processing system and method according to the present invention.

The flow chart in FIG. 14 illustrates operation of the sixth exemplary embodiment. An external world recognizing unit 5 repeats execution of vehicle detection at regular intervals, i.e., for example, 50 milliseconds.

Steps 701 to 708 in FIG. 14 correspond exactly to the before mentioned steps 601 to 608 shown in FIG. 13. For brevity, further description on the steps 701 to 708 is hereby omitted. After step 708, the routine proceeds to step 709.

At step 709, the recognizing unit 5 compares the extracted feature, given at step 708, to criteria to form an object to be determined as the preceding vehicle in front of the own vehicle by following, for example, steps (l) to (o).

Step (l): The recognizing unit 5 recalculates the object point obj_Y given at step 706 by using the following equation:

If (HoriEdge_Numb>0) {

$$obj\_Y = 1.7 \cdot focusV/(HoriEdge\_Length[max\_length] \quad (45)\}$$

Edge lengths of all of horizontal edges extracted at step 708 are collected as a set HoriEdge_Length. The denotation max_length represents an index number assigned to the longest edge length. The value 1.7 is a value of the width of ordinary standard vehicle in Japan.

Step (m): Using the object point obj_Y given at step (l), the recognizing unit 5 determines the widest limit obj_Wf of a width of the preceding vehicle to be detected and the narrowest limit obj_Wn of the width of the preceding vehicle to be detected. The widest limit obj_Wf and the narrowest limit obj_Wn may be expressed in terms of the number of pixels as:

$$obj\_Wn = (focusH \cdot pWn)/obj\_Y \quad (14)$$

$$obj\_Wf = (focusH \cdot pWf)/obj\_Y \quad (15)$$

Step (n): The recognizing unit 5 searches the set VertEdge of vertical edges to find at least a pair of vertical edges falling in a range defined between the widest and narrowest limits obj_Wn and obj_Wf. A horizontal coordinate of, on the image, a left-hand one of the vertical edges belonging to the pair is stored as CarCanEdge_Left, and a horizontal coordinate of a right-hand one of the vertical edges belonging to the same pair is stored as CarCanEdge_Right. What is mentioned above may be expressed as:

$$BodySpace = CarCanEdge\_Right[i] - CarCanEdge\_Left[i] \quad (16)$$

$$obj\_Wn < BodySpace < obj\_Wf \quad (17)$$

Step (o): The recognizing unit 5 searches the set HoriEdge of horizontal edges to find, with respect to each pair of vertical edges found at step (f), a horizontal edge that is disposed between and combined with the vertical edges belonging to the pair. For the combination of the horizontal edge with the vertical edges of the pair, the coordinate of the left-hand side is stored as CarEdge_L (the coordinate of a left-hand boundary of a region that may be detected as a vehicle), the coordinate of the right-hand side is stored as CarEdge_R (the coordinate of a right-hand boundary of the region that may be detected as the vehicle) and the coordinate of the bottom side is stored as CarEdge_B (the coordinate on the bottom boundary of the region that may be detected as the vehicle). What is mentioned above may be expressed as:

$$\text{If } (CarCanEdge\_Left[i] < HoriEdge\_x[j] < CarCanEdge\_Right[i]) \{ \quad (18)$$

$$CarEdge\_L[k] = CarCanEdge\_Left[i] \quad (19)$$

$$CarEdge\_R[k]=CarCanEdge\_Right[i] \quad (20)$$

$$CarEdge\_B[k]=HoriEdge\_x[j] \quad (21)$$

$$k=k+1 \quad (22)\}$$

After step 709, the routine proceeds to steps 710 to 713. The steps 710 to 713 correspond exactly to the before mentioned steps 210 to 213 shown in FIG. 2. For brevity, further description of the steps 710 to 713 is hereby omitted.

The seventh exemplary embodiment provides high performance vehicle detection with a single camera. This is because the threshold value used for vehicle detection is determined based on the lengths of the extracted feature. The frequency of erroneous detection of scene and/or painting on the road as a vehicle has been lowered.

According to one exemplary embodiment of an image processing system for a front-view image sensor, an image processing region is set to cover a front-view image picked up by the image sensor at one after another of various portions, which narrow, in area, with different positions in a direction remote from the own vehicle. A feature is extracted out of the image processing region set to cover one of the portions of the front-view image. The extracted feature is used for vehicle detection.

In the front-view image, the same preceding vehicle has varying sizes reducing with different positions in the direction remote from the own vehicle. Thus, setting the image processing region to cover the image at one after another of the various portions which narrow, in areas, with different positions in a direction remote from the own vehicle is effective to lower the probability of capturing objects other than the preceding vehicle. Under bad weather conditions, relatively narrow, in area, portions of the image are covered one after another for image processing over a wide range within the image, thus providing high performance and reliable vehicle detection.

According to one exemplary embodiment, the image processing region is set to cover the image at one after another of portions, which narrow, in area, with different positions along an estimate of a future track of the own vehicle, making it possible to quickly detect the preceding vehicle.

A feature is extracted from an image processing region set to cover one of the various portions of the image, and the extracted feature is used for vehicle detection. Upon detection of a target vehicle, further image processing is terminated immediately.

Usually, the target vehicle is the preceding vehicle in front. Terminating further image processing and arithmetic operation onwards immediately upon detection of the target vehicle lowers arithmetic operation load on a CPU with quick and reliable vehicle detection maintained.

According to one exemplary embodiment, an image processing region is set to cover a front-view image at one after another of various portions, which narrow, in area, with different positions in a direction remote from one of a plurality of laterally displaced positions from a center position in front of an own vehicle. Even if the areas covered are narrowed under bad weather conditions, reliable detection of the preceding vehicle traveling along a displaced portion within an own lane is maintained.

The probability of detecting the preceding vehicle in front of an own vehicle may increase by increasing the amount of longitudinal scanning from the central position in front of an own vehicle rather than the amount of longitudinal scanning from a position laterally displaced to the right or left from the central position.

According to one exemplary embodiment, when smaller area portions are set on a front-view image to be image processed one after another for longitudinal scanning, a number of image processing regions are set in a lateral direction. In this case, without increasing arithmetic load on a CPU, highly reliable detection of a vehicle is possible.

According to one exemplary embodiment, when relatively larger area portions are set on a front-view image to be image processed one after another when an own vehicle is traveling at low vehicle speed, there is no need to set a large number of image processing regions to cover a further remote range from the own vehicle. Thus, a reduction in number of setting the image processing regions can lower the arithmetic load on a CPU.

According to another exemplary embodiment, image processing regions are allowed to be set on a front-view image within an area beyond a predetermined distance from an own vehicle. It is possible to accurately acquire a distance to the preceding vehicle in front of the own vehicle.

According to another exemplary embodiment, the scanning intervals of space become wide as the distance from an own vehicle becomes long so that they vary in perspective of a front-view image picked up by a camera. As a result, threshold values on the front-view image vary in good balance with the image.

According to another exemplary embodiment, a threshold value used for vehicle detection is determined based on the coordinates of a feature extracted out of image processing of a portion of a front-view image. The frequency of erroneous detection of scene and/or painting on a road as a vehicle has been lowered.

According to another exemplary embodiment, a threshold value used for vehicle detection is determined based on the lengths of features extracted from image processing a portion of a front-view image. The frequency of erroneous detection of scene and/or painting on a road as a vehicle has been lowered.

An image processing region extends in a lateral direction at most twice as wide as an own vehicle and in a longitudinal direction less than the dimension in the lateral direction. Setting the image processing region in this manner assures reliable vehicle detection by excluding scene and objects unnecessary for the vehicle detection.

From the preceding description, it is understood that a CCD camera 3 may constitute a front-view image sensor, and an external world recognizing unit 5 performs the function of a region setting device, a feature extracting device, a vehicle detecting device, and a future track estimating device. Other components than the illustrated devices or unit may constitute the claimed elements.

While the best modes for carrying out the invention have been described in detail, those familiar with the art to which the present invention relates will recognize various alternative designs and embodiments for practicing the invention as defined by the following claims.

What is claimed is:

1. An image processing system for a front-view image sensor, comprising:
    an image sensor arranged on a vehicle to pick up a front-view image in front of the vehicle;
    a region setting device configured to set a plurality of image processing regions to cover on the front-view image various portions one after another, wherein the portions have different positions in a direction remote from the vehicle and the region setting device is configured to reduce the plurality of image processing regions in area as a distance of the portions from the vehicle increase;
a feature extracting device configured to extract a feature out of the portions of the front-view image covered by the plurality of image processing regions set by the region setting device; and
a presence judging device configured to judge the presence of an obstacle based on the feature extracted by the feature extracting device.

2. The image processing system as recited in claim 1, further comprising:
a track estimating device configured to provide an estimate of a future track of the vehicle; and
wherein said region setting device is configured to set a plurality of image processing regions along the estimate of the future track of the vehicle.

3. The image processing system as recited in claim 1, wherein, upon the region setting device setting each of the plurality of image processing regions, the feature extracting device is configured to extract a feature out of an image processing region that has been set and the presence judging device is configured to judge the presence of an obstacle based on the feature extracted out of the image processing region that has been set, and wherein, upon the presence judging device judging the presence of an obstacle, the region setting device, the feature extracting device and the presence judging device cease to operate.

4. The image processing system as recited in claim 1, wherein the region setting device defines a plurality of lateral positions, and the region setting device sets the image processing regions to cover the front-view image picked up by the image sensor at one after another of the various portions, which narrow in area, with a different position in a direction remote from each of the plurality of lateral positions.

5. The image processing system as recited in claim 4, wherein the plurality of image processing regions set by the region setting device, when the region setting device begins setting a plurality of image processing regions in a position in front of the vehicle, is greater in number than a plurality of image processing regions set by the region setting device when the region setting device begins setting a plurality of image processing regions in each of the plurality of lateral positions.

6. The image processing system as recited in claim 4, wherein, where a need arises for a reduced area of the plurality of image processing regions, the plurality of image processing regions, set by the region setting device when the region setting device begins setting a plurality of image processing regions in a position in front of the vehicle, is less in number than a plurality of image processing regions set by the region setting device when the region setting device begins setting a plurality of image processing regions at each of the plurality of lateral positions.

7. The image processing system as recited in claim 1, wherein, where a need arises for an increased area of the plurality of image processing regions, the plurality of image processing regions is reduced in number.

8. The image processing system as recited in claim 1, wherein the region setting device is configured to set the plurality of image processing regions in the front-view image from a point corresponding to a position spaced a predetermined distance in front of the vehicle.

9. The image processing system as recited in claim 1, wherein the region setting device sets the plurality of image processing regions spaced one after another with a distance that increases in a direction remote from the vehicle.

10. The image processing system as recited in claim 8, wherein the presence judging device is configured to set a threshold based on a distance from the vehicle to each of the plurality of image processing regions set by the region setting device, and compares the feature extracted out of the image processing region by the feature extracting device to the threshold to judge the presence of an obstacle.

11. The image processing system as recited in claim 1, wherein the presence judging device is configured to set a threshold based on coordinates of the feature extracted out of each of the plurality of image processing regions by the feature extracting device, and compares the feature extracted out of each of the plurality of image processing regions by the feature extracting device to the threshold to judge the presence of an obstacle.

12. The image processing system as recited in claim 1, wherein the presence judging device is configured to set a threshold based on a length of the feature extracted out of each of the plurality of image processing regions by the feature extracting device, and compares the feature extracted out of each of the plurality of image processing regions by the feature extracting device to the threshold to judge the presence of an obstacle.

13. The image processing system as recited in claim 1, wherein the region setting device sets an image processing region extending laterally with respect to the vehicle at up to twice as wide as the width of an obstacle.

14. The image processing system as recited in claim 1, wherein the region setting device sets an image processing region to have a lateral measure that is longer than a longitudinal measure, with respect to the vehicle.

15. An image processing method for a front-view image sensor, comprising:
obtaining a front-view image in front of a vehicle with an image sensor;
setting image processing regions to cover on the front-view image, at one after another various portions with a region setting device, wherein the region setting device is configured to reduce the image processing regions in area as a distance of the portions from the vehicle increase;
extracting a feature out of the image by image processing a portion of the front-view image covered by a set image processing region with a feature extracting device; and
judging a presence of an obstacle based on the feature extracted by the feature extracting step with a presence judging device.

16. The image processing system as recited in claim 1, wherein the region setting device is configured to set an image processing region to be more narrow in area in a forward longitudinal direction so that an area of the processing region is at a maximum when the region is at a position nearest to the front of the vehicle.

17. The image processing system as recited in claim 1, wherein the region setting device is configured to set an image processing region with an initial distance from a front of the vehicle that is dependent upon a speed of the vehicle.

18. The image processing system as recited in claim 1, wherein the region setting device is configured to set the plurality of image processing regions spaced at longitudinal distances from the front of the vehicle in proportion to a speed of the vehicle.

19. The image processing system as recited in claim 1, wherein the image sensor includes a camera and a radar device.

20. The image processing system as recited in claim 1, wherein the image sensor includes a camera.

21. The image processing system as recited in claim 1, wherein the image sensor includes a radar device.

22. An image processing system for a front-view image sensor, comprising:
- an image sensor arranged on a vehicle to pick up a front-view image in front of the vehicle;
- a region setting device configured to set image processing regions to cover on the front-view image various portions one after another, wherein the portions have different positions in a direction remote from the vehicle and the region setting device is configured to reduce the image processing regions in area as a distance of the portions from the vehicle increase;
- a feature extracting device configured to extract a feature out of the portions of the front-view image covered by the image processing regions set by the region setting device; and
- wherein the region setting device defines a plurality of lateral positions, and the region setting device sets image processing regions to cover on the front-view image picked up by the image sensor various portions one after another, which narrow in area, with different position in a direction remote from each of the plurality of lateral positions.

23. An image processing system for a front-view image sensor, comprising:
- an image sensor arranged on a vehicle to pick up a front-view image in front of the vehicle;
- a future position estimating device for estimating a future position of the vehicle and/or a preceding vehicle;
- a region setting device configured to set image processing regions to cover on the front-view image various portions one after another, wherein the regions are arranged upon the basis of the future position of the vehicle and/or the future position of the preceding vehicle and the region setting device is configured to reduce the plurality of image processing regions in area as a distance of the portions from the vehicle increase;
- a feature extracting device configured to extract a feature out of image processing of the portions of the front-view image covered by the image processing regions set by the region setting device; and
- a presence judging device configured to judge the presence of a preceding vehicle based on the feature extracted by the feature extracting device.

* * * * *